(12) United States Patent
Matsukawa

(10) Patent No.: US 12,009,714 B2
(45) Date of Patent: Jun. 11, 2024

(54) ROTATING ELECTRIC MACHINE STATOR AND ROTATING ELECTRIC MACHINE

(71) Applicant: Mitsubishi Electric Corporation, Tokyo (JP)

(72) Inventor: Shinri Matsukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 300 days.

(21) Appl. No.: 17/638,948

(22) PCT Filed: Nov. 30, 2020

(86) PCT No.: PCT/JP2020/044519
§ 371 (c)(1),
(2) Date: Feb. 28, 2022

(87) PCT Pub. No.: WO2021/112040
PCT Pub. Date: Jun. 10, 2021

(65) Prior Publication Data
US 2022/0302783 A1   Sep. 22, 2022

(30) Foreign Application Priority Data
Dec. 2, 2019   (JP) .................................. 2019-217746

(51) Int. Cl.
*H02K 3/12*   (2006.01)
*H02K 1/16*   (2006.01)
*H02K 3/28*   (2006.01)

(52) U.S. Cl.
CPC ................. *H02K 3/12* (2013.01); *H02K 1/16* (2013.01); *H02K 3/28* (2013.01); *H02K 2213/03* (2013.01)

(58) Field of Classification Search
CPC .. H02K 1/16; H02K 3/12; H02K 3/28; H02K 2213/03
(Continued)

(56) References Cited

U.S. PATENT DOCUMENTS 6,943,477 B1 *   9/2005   Nakamura ............... H02K 3/28
                                                                310/198
2006/0038459 A1   2/2006   Adaniya et al.
(Continued)

FOREIGN PATENT DOCUMENTS

JP   S554675 U   1/1980
JP   2006060915 A   3/2006
(Continued)

OTHER PUBLICATIONS

Office Action issued in corresponding JP Patent Application No. 2021-562635, mailed Nov. 29, 2022. 7 pages including 4 pages of English Translation.
(Continued)

*Primary Examiner* — Rashad H Johnson
(74) *Attorney, Agent, or Firm* — BUCHANAN INGERSOLL & ROONEY PC

(57) ABSTRACT

A winding of a stator has a plurality of divisional coils. Where a number of poles of a rotor used together with the stator is P, a number of phases of an AC power supply applied to a rotating electric machine is M which is an integer not less than 3, and a number of slots is Sn, a number q of slots per pole per phase represented as $q=Sn/(P \times M)$ is an irreducible fraction. The divisional coils include two types which are a large-divisional coil of which a pair of slot-inside stored portions are each stored alone in the slot, and a small-divisional coil of which the pair of slot-inside stored portions are each stored in the slot together with the slot-inside stored portion of the other corresponding divisional coil.

20 Claims, 26 Drawing Sheets

(58) Field of Classification Search
USPC .......................................... 310/179, 181, 184
See application file for complete search history.

(56) References Cited

U.S. PATENT DOCUMENTS

| | | | | |
|---|---|---|---|---|
| 2010/0194230 A1* | 8/2010 | Naganawa | ............ | H02K 15/066 |
| | | | | 29/735 |
| 2015/0042196 A1* | 2/2015 | Awazu | ..................... | H02K 3/48 |
| | | | | 310/198 |
| 2015/0372552 A1 | 12/2015 | Ito | | |
| 2016/0329767 A1* | 11/2016 | Umeda | ................ | H02K 1/2706 |
| 2017/0126082 A1* | 5/2017 | Kusase | ..................... | H02K 3/28 |
| 2018/0145549 A1* | 5/2018 | Hino | ....................... | H02K 3/14 |
| 2018/0351427 A1* | 12/2018 | Kuroyanagi | ......... | H02K 15/065 |
| 2018/0358857 A1* | 12/2018 | Sakuma | ............... | H02K 15/045 |
| 2019/0013710 A1* | 1/2019 | Kawasaki | ............. | H02K 1/148 |
| 2021/0305868 A1* | 9/2021 | Sakuma | ................. | H02K 21/16 |
| 2022/0263356 A1* | 8/2022 | Hijikata | ............... | H02K 19/103 |
| 2022/0302783 A1* | 9/2022 | Matsukawa | ............. | H02K 3/34 |
| 2023/0093998 A1* | 3/2023 | Miyoshi | ................... | H02K 3/28 |
| | | | | 310/208 |
| 2023/0127155 A1* | 4/2023 | Ito | ............................ | H02K 1/16 |
| | | | | 310/208 |
| 2023/0179054 A1* | 6/2023 | Ito | ........................ | H02K 15/085 |
| | | | | 310/179 |
| 2023/0208232 A1* | 6/2023 | Ishikawa | ................ | H02K 21/14 |
| | | | | 310/179 |
| 2023/0231456 A1* | 7/2023 | Masuko | ................... | H02K 3/18 |
| | | | | 417/410.1 |
| 2023/0268790 A1* | 8/2023 | Ito | ............................ | H02K 3/12 |
| | | | | 310/179 |
| 2023/0291263 A1* | 9/2023 | Matsuoka | .............. | H02K 21/16 |
| 2023/0318381 A1* | 10/2023 | Ishikawa | ................ | H02K 21/14 |
| | | | | 310/208 |
| 2024/0006967 A1* | 1/2024 | Seguchi | ................. | H02K 19/28 |
| 2024/0039355 A1* | 2/2024 | Takahashi | ................ | B60K 7/00 |

FOREIGN PATENT DOCUMENTS

| | | |
|---|---|---|
| JP | 2016005409 A | 1/2016 |
| JP | 2017046508 A | 3/2017 |

OTHER PUBLICATIONS

International Search Report (PCT/ISA/210) with translation and Written Opinion (PCT/ISA/237) mailed on Feb. 2, 2021, by the Japan Patent Office as the International Searching Authority for International Application No. PCT/JP2020/044519.

* cited by examiner

100A

100B

ROTATING ELECTRIC MACHINE STATOR AND ROTATING ELECTRIC MACHINE

TECHNICAL FIELD

The present disclosure relates to a rotating electric machine stator and a rotating electric machine.

BACKGROUND ART

Where the number of poles of a rotor of a rotating electric machine is P, the number of phases of an AC power supply is M, and the number of slots in which a winding of the stator is inserted is Sn, a number q of slots per pole per phase is represented as $q=Sn/(P \times M)$, and in general, the number Sn of slots is selected so that q becomes an integer. Meanwhile, there is known a coil winding method called fractional slot winding in which the number Sn of slots is selected so that q becomes an irreducible fraction. The fractional slot winding is adopted for reducing torque ripple or for a pole changing (duplex winding) motor, etc.

CITATION LIST

Patent Document

Patent Document 1: Japanese Laid-Open Patent Publication No. 2016-005409

SUMMARY OF THE INVENTION

Problems to be Solved by the Invention

In the fractional slot winding, coils forming different phases are wound in the same slot by lap winding. Therefore, there are a large number of divisional coils, thus causing a problem of complicating a work for inserting a winding into slots.

The present disclosure has been made to solve the above problem, and an object of the present disclosure is to provide a rotating electric machine stator and a rotating electric machine in which the number of divisional coils is decreased, whereby the manufacturing cost for divisional coils can be reduced and a work for inserting a winding into slots can be simplified.

Solution to the Problems

A stator of a rotating electric machine according to the present disclosure includes a winding, and the winding has a plurality of divisional coils. Each of the divisional coils has a pair of slot-inside stored portions which are respectively stored in different slots among a plurality of slots formed between adjacent teeth of the stator. Where a number of poles of a rotor used together with the stator is P, a number of phases of an AC power supply applied to the rotating electric machine is M which is an integer not less than 3, and a number of the slots is Sn, a number q of slots per pole per phase represented as $q=Sn/(P \times M)$ is an irreducible fraction. The divisional coils include two types which are a large-divisional coil of which the pair of slot-inside stored portions are each stored alone in the slot, and a small-divisional coil of which the pair of slot-inside stored portions are each stored in the slot together with the slot-inside stored portion of the other corresponding divisional coil.

A rotating electric machine according to the present disclosure includes: the above stator; and a rotor provided such that an outer circumferential surface thereof is opposed to an inner circumferential surface of the stator.

Effect of the Invention

The rotating electric machine stator and the rotating electric machine according to the present disclosure make it possible to provide a rotating electric machine stator and a rotating electric machine in which the number of divisional coils is decreased, whereby the manufacturing cost for divisional coils can be reduced and a work for inserting a winding into slots can be simplified.

DESCRIPTION OF EMBODIMENTS

Embodiment 1

Figure 1:
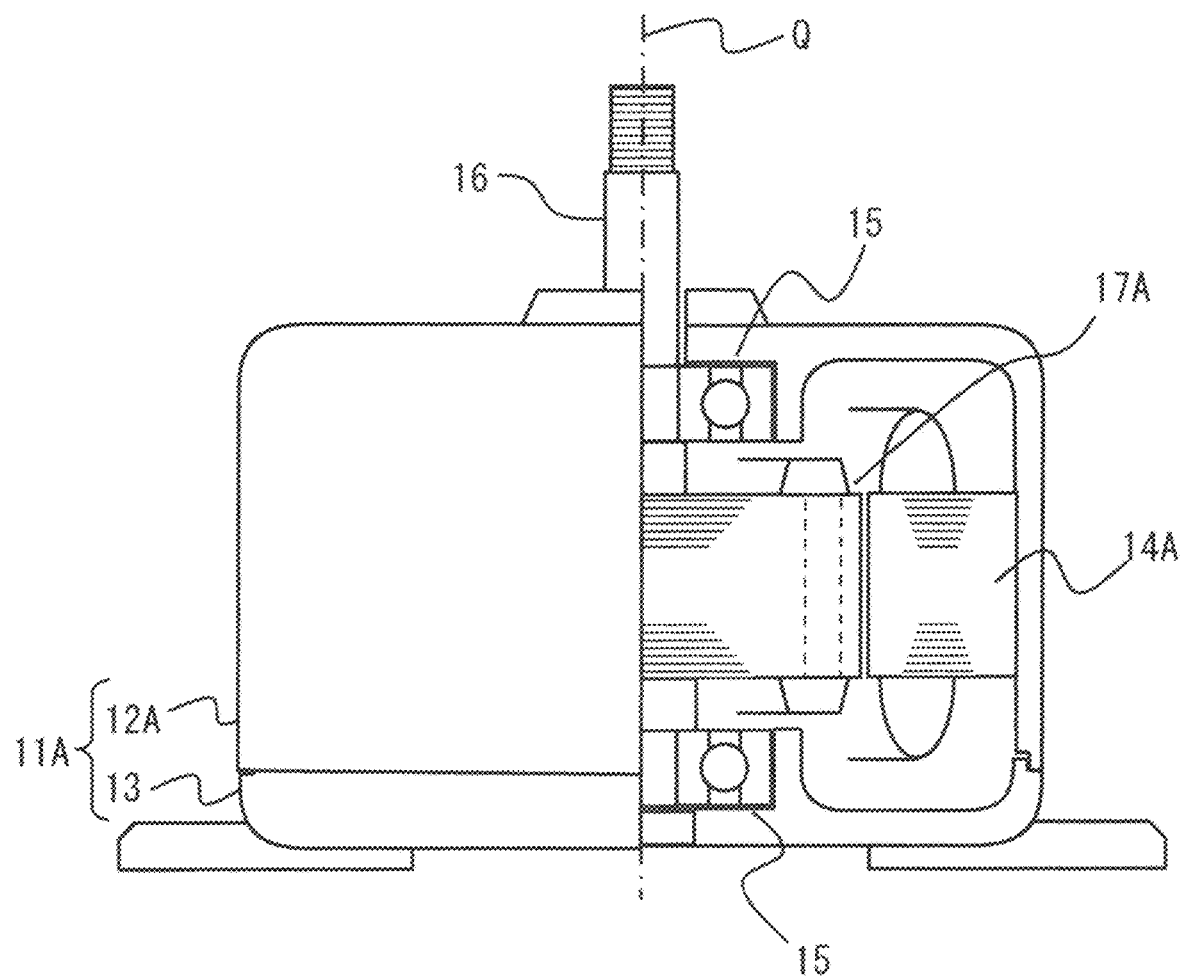
FIG. 1 is a one-side-sectional schematic front view of a rotating electric machine according to embodiment 1.

Hereinafter, a rotating electric machine stator and a rotating electric machine according to embodiment 1 will be described. In the following description, when an "axial direction", a "radial direction", and a "circumferential direction" are merely mentioned, they respectively refer to an "axial direction", a "radial direction", and a "circumferential direction" of the stator. A divisional coil refers to a minimum unit coil forming a winding of the rotating electric machine stator and having a pair of slot-inside stored portions stored in different slots. A single-layer coil and a large-divisional coil refer to such a divisional coil that only a slot-inside stored portion of one divisional coil is stored alone in one slot. A two-layer coil and a small-divisional coil refer to each of two divisional coils whose slot-inside stored portions are stored together so as to be overlapped in the radial direction in the same slot.

FIG. 4, FIG. 6 to FIG. 9, and FIG. 13 to FIG. 25 show developed sectional views in which a winding of a cylindrical stator of the rotating electric machine is cut open and arranged in a straight shape. In hatching of coils shown in the drawings, oblique lines from upper left to lower right represent divisional coils for U phase, oblique lines from upper right to lower left represent divisional coils for V phase, and transverse lines represent divisional coils for W phase.

FIG. 1 is a one-side-sectional schematic front view of a rotating electric machine 100A according to embodiment 1.

The rotating electric machine 100A includes a housing 11A formed of a bottomed cylindrical frame 12A and a bracket 13 closing an opening of the frame 12A, a stator 14A fitted to the inner side of the cylindrical part of the frame 12A, and a rotor 17A which is supported rotatably around an axis Q of a rotary shaft 16 via bearings 15 at a bottom part (upper side in FIG. 1) of the frame 12A and a center part of the bracket 13 and has an outer circumferential surface opposed to the inner circumferential surface of the stator 14A.

The rotating electric machine 100A is a squirrel-cage induction rotating electric machine in which the rotor 17A is composed of squirrel-cage conductors and a core. Alternatively, the rotating electric machine 100A may be any of a wound-type induction rotating electric machine in which a winding is provided to a rotor, a surface-magnet-type rotating electric machine having permanent magnets at the surface of a rotor, an interior-permanent-magnet rotating electric machine having permanent magnets embedded inside a rotor, or a synchronous-reluctance rotating electric machine having a rotor that rotates by reluctance torque with saliency imparted to the inductance by using such a shape that an arc-shaped groove is formed in stacked electromagnetic steel sheets.

Figure 2:
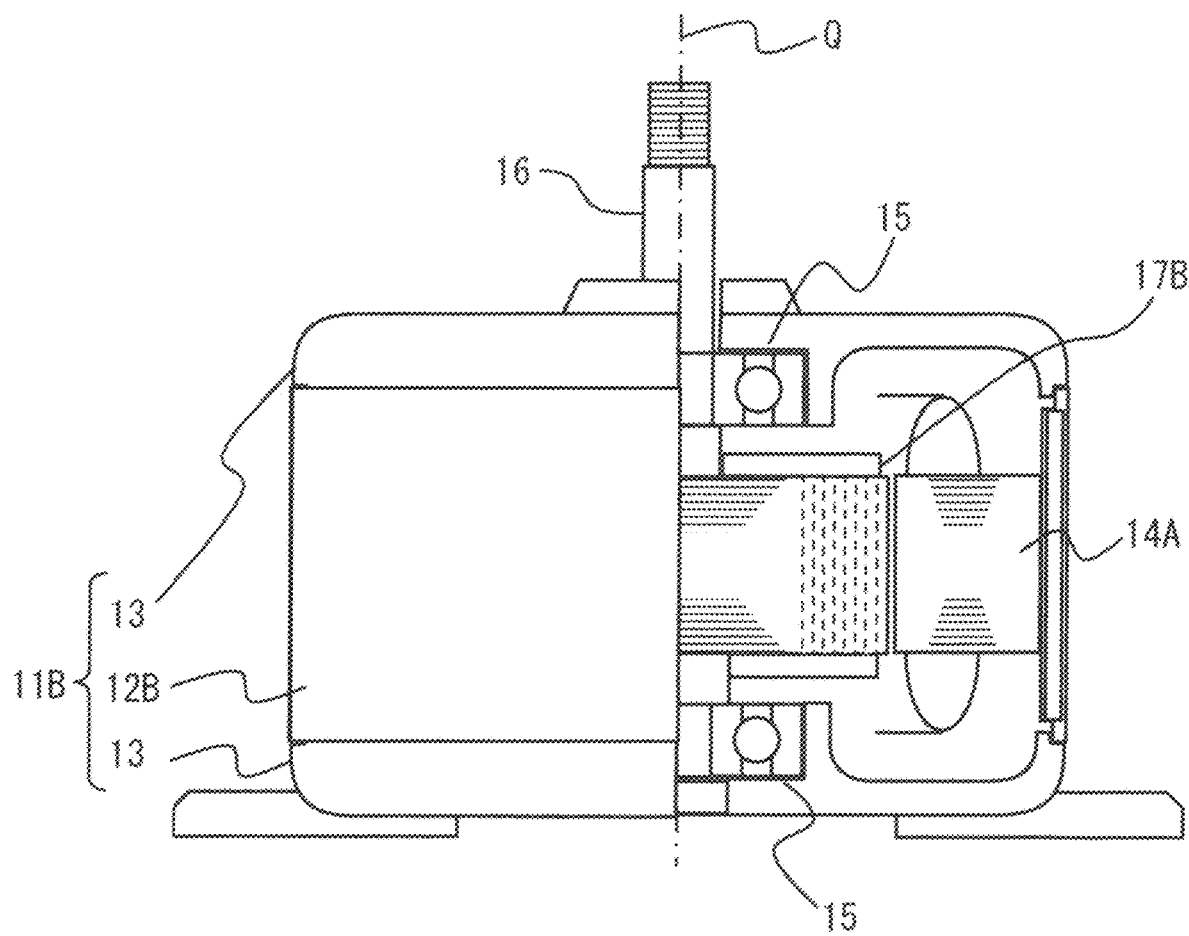
FIG. 2 is a one-side-sectional schematic front view of a rotating electric machine according to embodiment 1.

FIG. 2 is a one-side-sectional schematic front view of a rotating electric machine 100B.

The rotating electric machine 100B is another example of the rotating electric machine 100A. A housing 11B is formed of a frame 12B having a cylindrical shape instead of a bottomed cylindrical shape, and two brackets 13 closing openings of the frame 12B at both ends in the axial direction. A rotor 17B is an example of the rotor used for the synchronous-reluctance rotating electric machine, among the above rotors.

Figure 3:
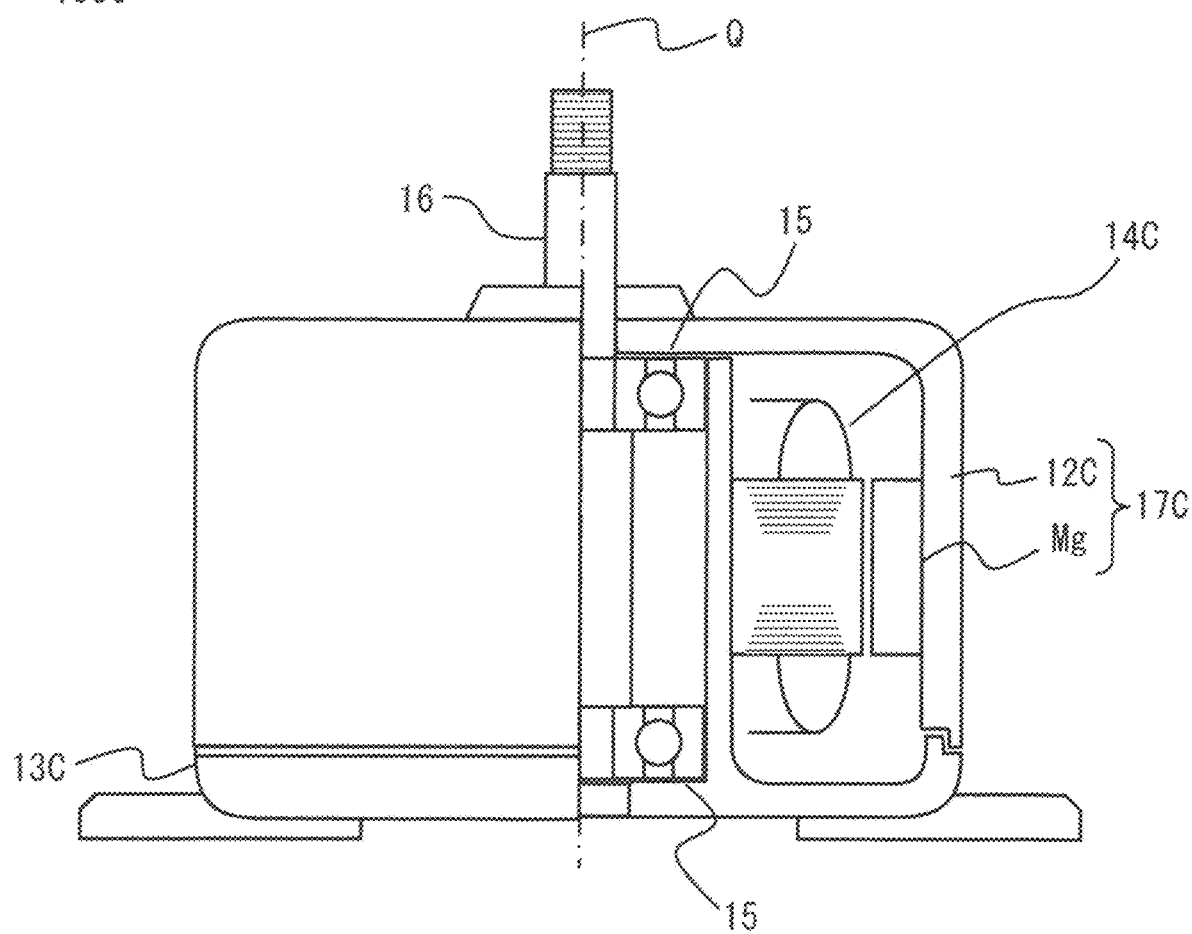
FIG. 3 is a one-side-sectional schematic front view of a rotating electric machine according to embodiment 1.

FIG. 3 is a one-side-sectional schematic front view of a rotating electric machine 100C.

The rotating electric machine 100C is still another example of the rotating electric machine 100A.

The rotating electric machine 100C is an outer-rotor rotating electric machine. A rotor 17C is a surface-magnet-type rotor.

A stator 14C is fixed in an outer fitted state to a bracket 13C. The rotor 17C has a bottomed cylindrical frame 12C and a permanent magnet Mg provided on the inner side of the frame 12C and opposed to the radially outer side of the stator 14C. The rotor 17C is supported rotatably around the rotary shaft 16 via bearings 15.

Figure 4:
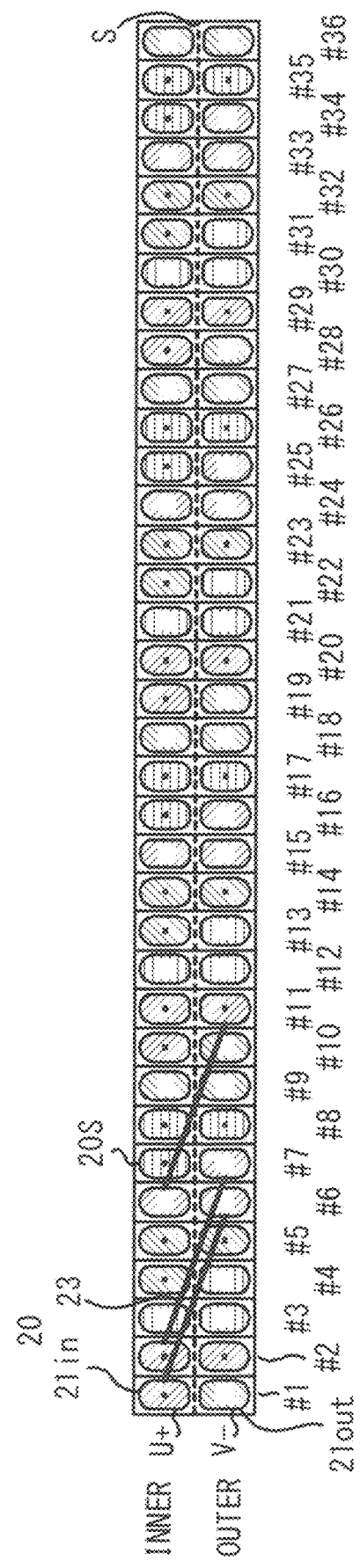
FIG. 4 is a developed sectional view of a winding by fractional slot winding in a comparative example.

FIG. 4 is a developed sectional view of a winding 20 by fractional slot winding in a comparative example. FIG. 4 is a sectional view when the winding 20 cylindrically mounted to the stator is cut perpendicularly to the axial direction at a part stored in each slot and is cut open in the axial direction and developed. The upper side in FIG. 4 is the inner side of the stator, and the lower side in FIG. 4 is the outer side (back yoke side) of the stator. In addition, #1 to #36 denote numbers of slots S. In the actual cross-section, the slots S at #1 and #36 are adjacent to each other, thus forming an annular shape.

In each slot S, an inner slot-inside stored portion 21in (upper coil) and an outer slot-inside stored portion 21out (lower coil) are inserted. The inner slot-inside stored portion 21in is located on a gap surface side opposed to the rotor, and the outer slot-inside stored portion 21out is located at the bottom of the slot S, i.e., on the back yoke side of the stator.

In this example, a number P of poles of the rotor of the rotating electric machine is 8, a number M of phases of an applied AC power supply is 3, and a number Sn of slots in which the winding of the stator is inserted is 36. Therefore, a number q of slots per pole per phase is represented as $q = Sn/(P \times M) = 36/(8 \times 3) = 1 + \frac{1}{2}$, i.e., becomes an irreducible fraction 3/2. Thus, the winding 20 is wound by fractional slot winding in which the number q of slots per pole per phase is not an integer. In addition, the winding 20 is wound by full-pitch fractional slot winding in which divisional coils for respective phases are sequentially wound in the slots from #1 to #6, from #2 to #7, from #3 to #8, . . . , and the coil pitch (the number of straddled teeth) for all the divisional coils is 5 pitch (hereinafter, similarly denoted as number+pitch). Twelve divisional coils are provided for each phase, and thirty-six divisional coils are provided in total.

In FIG. 4, for facilitating understanding of the drawing, lap winding connection states of coil end portions 23 are indicated by oblique lines only for three divisional coils from #1 to #6, from #2 to #7, from #6 to #11 corresponding to 1/4 (i.e., two poles) of eight poles for U phase, and the other coil end portions are not shown.

The directions of current conduction through the winding 20 are indicated by "·" and "×". The current conduction direction "·" is a direction approaching from the back side to the front side of the sheet in the direction perpendicular to the sheet, and conversely, the current conduction direction "×" is a direction going away from the front side to the back side of the sheet.

Figure 5:
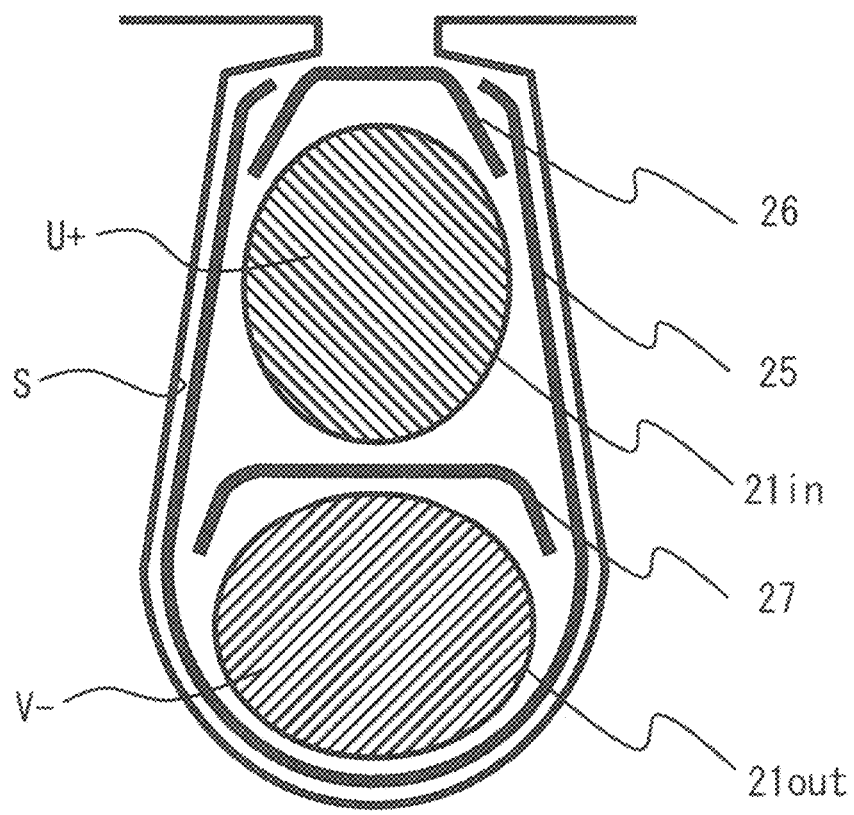
FIG. 5 is a detailed sectional view of one slot according to embodiment 1.

FIG. 5 is a detailed sectional view of one slot S. The slot S is formed between adjacent teeth (not shown) of the stator. In the slot S at #1, the divisional coil for U phase + ("+ means a radially inner side) is stored as the inner slot-inside stored portion 21in, and the divisional coil for V phase − ("−" means a radially outer side) is stored as the outer slot-inside stored portion 21out.

In addition, a slot cell 25 for insulating the stator core and the winding 20 from each other, a wedge 26 for holding the slot-inside stored portion of the divisional coil so that the slot-inside stored portion does not come out from the core, and a separator 27 for ensuring inter-phase insulation between the inner slot-inside stored portion 21in and the outer slot-inside stored portion 21out, are inserted. The slot cell 25, the wedge 26, and the separator 27 are not shown in developed sectional views in FIG. 6 and subsequent figures.

The slot-inside stored portions of the respective divisional coils are inserted in an overlapped manner on the outer side and the inner side of the slot S. The winding 20 is wound in a two-layer lap winding manner in which one of slot-inside stored portions of each of two divisional coils is necessarily inserted in each slot S, and there are 36 divisional coils and there are 72 slot-inside stored portions inserted in the slots S. In mounting the winding 20, the divisional coils are inserted in order into the slots S, and therefore, if there are a large number of divisional coils to be mounted, the work time required for inserting the divisional coils is increased.

In addition, it is necessary to insert the divisional coils for the respective phases of U phase, V phase, and W phase into the slots S alternately, and therefore, for five divisional coils just after start of divisional coil insertion, a coil raising work is needed (i.e., for a slot in which the inner slot-inside stored portion is inserted before insertion of the outer slot-inside stored portion, at the time of inserting the outer slot-inside stored portion later, the inner slot-inside stored portion already inserted is moved out of the slot once, the outer slot-inside stored portion is inserted, and then the inner slot-inside stored portion is inserted again). Thus, productivity of the winding 20 is low, automatic winding insertion by a coil inserter cannot be performed, and it is necessary to mount the winding 20 by manually inserting the divisional coils.

Figure 6:
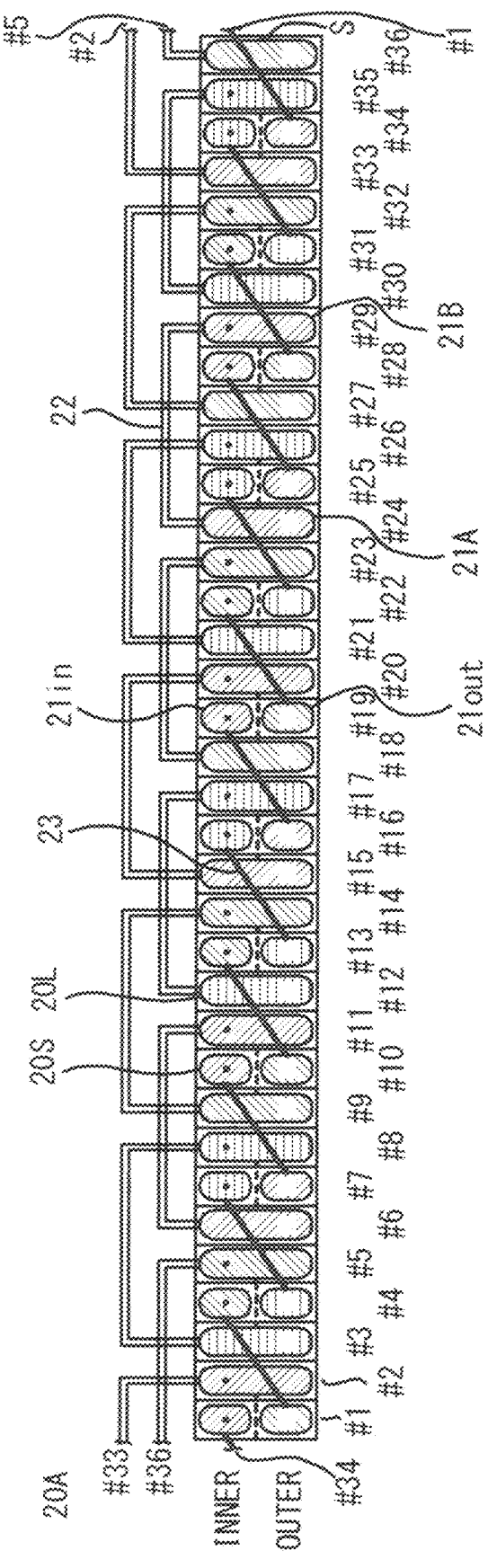
FIG. 6 is a developed sectional view of a winding by fractional slot winding according to embodiment 1.

FIG. 6 is a developed sectional view of a winding 20A of the fractional slot winding according to embodiment 1. FIG. 6 is a sectional view when the winding 20A cylindrically mounted to the stator is cut perpendicularly to the axial direction at a part stored in each slot S and is cut open in the axial direction and developed (the same applies to the drawings of the same type below).

The winding 20A is formed with 3 phases, 8 poles, and 36 slots, i.e., P=8, M=3, Sn=36. Therefore, the number q of slots per pole per phase is represented as q=Sn/(P×M)=1+½. The winding 20A is wound by fractional slot winding in which the number q of slots per pole per phase is the same as that for the winding 20 in FIG. 4.

Here, in each of the slots #1, #4, #7, #10, #13, #16, #19, #22, #25, #28, #31, #34 in FIG. 6, the inner slot-inside stored portion 21in of one divisional coil and the outer slot-inside stored portion 21out of another divisional coil corresponding to the inner slot-inside stored portion 21in are inserted as in FIG. 4. For these slots, the winding 20A is wound in a two-layer lap winding manner. Winding is performed by connecting the inner slot-inside stored portion 21in and the outer slot-inside stored portion 21out of one divisional coil via the coil end portion 23, and each coil end portion is stacked above an axial-direction end surface of the stator core.

In addition, the inner slot-inside stored portion 21in and the outer slot-inside stored portion 21out in each of these slots S (e.g., slot #19 in FIG. 6) form different phases.

Therefore, between the inner slot-inside stored portion 21in and the outer slot-inside stored portion 21out, the separator 27 is needed for inter-phase insulation as with the winding 20 shown in FIG. 4.

On the other hand, for the other slots, comparison between FIG. 4 and FIG. 6 will be shown below. In FIG. 4, the phases of the inner slot-inside stored portion 21in and the outer slot-inside stored portion 21out inserted in the same slot are equal to each other and the current conduction directions of the inner slot-inside stored portion 21in and the outer slot-inside stored portion 21out are also equal to each other. Accordingly, the inner slot-inside stored portion 21in and the outer slot-inside stored portion 21out can be integrated into one part and the number of turns of each divisional coil can be doubled as compared to the other divisional coils (e.g., winding is performed by connecting the slot-inside stored portion 21A inserted in the slot #24 and the slot-inside stored portion 21B inserted in the slot #29 in FIG. 6 via a coil end portion 22 by concentric winding, so as to form a single-layer concentric winding coil).

For convenience sake in the developed sectional view, the coil end portion 22 for concentric winding is shown in an angled C shape so as to protrude upward, but in actuality, the coil end portion 22 does not protrude inward and is formed in the axial direction. Therefore, the winding 20A is wound by concentric lap winding in which lap winding coils and concentric winding coils are formed in combination in one core. In the example in FIG. 6, there are twelve divisional coils for two-layer lap winding, and there are twelve divisional coils for single-layer concentric winding, so that there are a total of twenty-four divisional coils for concentric lap winding. Thus, as compared to the winding 20, the number of divisional coils can be decreased by 12, i.e., 33.3%.

The coil end portion 22 of the divisional coil for single-layer concentric winding is shown by a double line. This does not represent physical two conductors but indicates that the coil end portion 22 has two times as many wires as the coil end portion 23 of the divisional coil for two-layer lap winding. Thus, in the winding 20A shown in FIG. 6, the number of divisional coils can be decreased by 12, i.e., 33.3%, as compared to the winding 20 shown in FIG. 4.

In the case of the winding 20 by two-layer lap winding described with reference to FIG. 4, there are thirty-six divisional coils for 5 pitch (two inner slot-inside stored portions 21in are stored in two slots S straddling five teeth; the same applies to the outer slot-inside stored portions 21out). Therefore, the coil end portions 23 have a length corresponding to 5×36=180 pitch. On the other hand, in the case of concentric lap winding in FIG. 6, there are twelve large-divisional coils 20L for 5 pitch and twelve small-divisional coils 20S for 3 pitch. Since the winding is formed of twelve large-divisional coils 20L for a large pitch and twelve small-divisional coils 20S for a smaller pitch than that for the large-divisional coils 20L, the coil end portions have a length corresponding to 5×12×2+3×12=156 pitch. Thus, as compared to the coil end portions in two-layer lap winding, the circumferential-direction length of the coil end portions can be shortened by 13%. As a result, efficiency of the rotating electric machine can be improved owing to reduction in primary copper loss, property of the rotating electric machine can be improved owing to reduction in leakage reactance at the coil end portions, and the weight can be reduced owing to reduction in copper amount. The reason for multiplication by 2 in the calculation expression (5×12×2) for the length of the coil end portions of the large-divisional coils 20L is that the number of wires forming each large-divisional coil 20L is two times the number of wires forming the small-divisional coil 20S. Therefore, the actual comparison target is the number of wires forming each coil end portion×the length of coil end portions.

With the rotating electric machine stator and the rotating electric machine according to embodiment 1, the number of divisional coils used in a stator is decreased, whereby the manufacturing cost for divisional coils can be reduced and a work for inserting a winding into slots can be simplified.

In addition, the total length of wires forming the coil end portions can be shortened, and as a result, the height of the coil end portions can be reduced and thus a rotating electric machine having a short axial length can be provided.

In the example in FIG. 6, a case where the number q of slots per pole per phase is 1.5=1+½ has been shown, but the same effects can be obtained with any fractional slot winding in which the denominator is 2 or 3, e.g., q=1+⅓, 1+⅔, 2+⅓, 2+½, 2+⅔, etc.

Embodiment 2

Hereinafter, with reference to the drawings, a rotating electric machine according to embodiment 2 will be described focusing on difference from embodiment 1.

Figure 7:
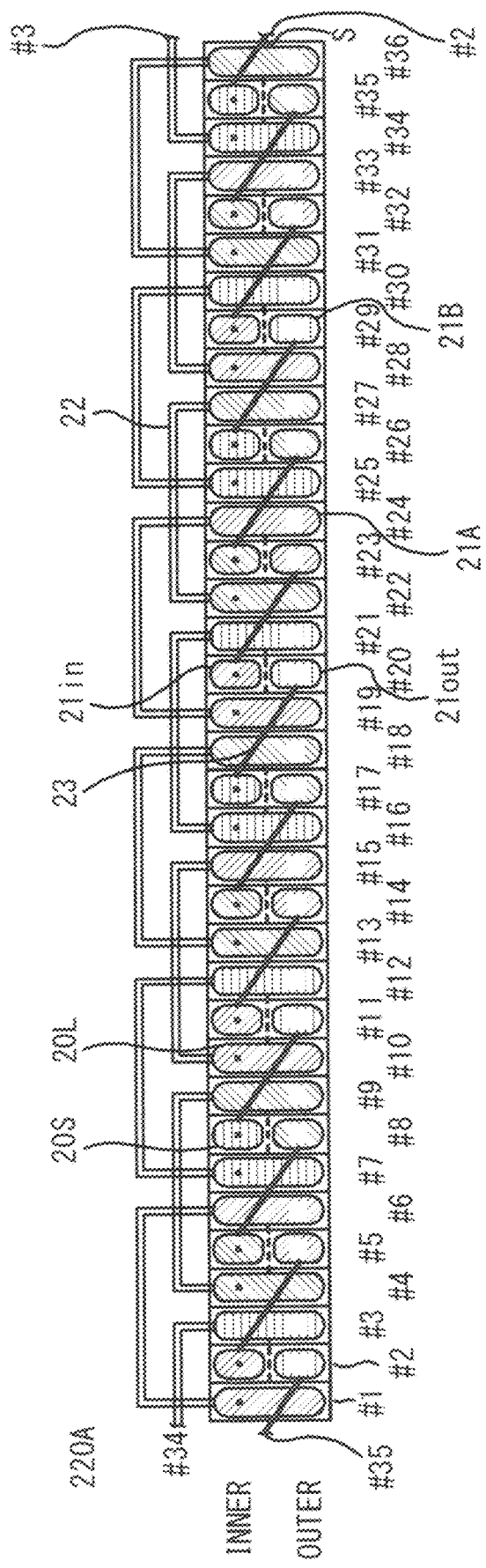
FIG. 7 is a developed sectional view of a winding by fractional slot winding according to embodiment 2.

FIG. 7 is a developed sectional view of a winding 220A by fractional slot winding.

The winding 220A is formed with 3 phases, 8 poles, and 36 slots by fractional slot winding in which the number q of slots per pole per phase is 1+½, as in the windings 20, 20A described in embodiment 1, whereas the coil directions, the lapping directions of lap winding, and the coil positions inside the slots are different from those for the winding 20A in FIG. 6. However, a generated rotating magnetic field is completely the same as in the case of the winding 20A in FIG. 6, and therefore completely the same effects as in the rotating electric machine in FIG. 6 are provided.

Embodiment 3

Hereinafter, with reference to the drawings, a rotating electric machine according to embodiment 3 will be described focusing on difference from embodiment 1.

Figure 8:
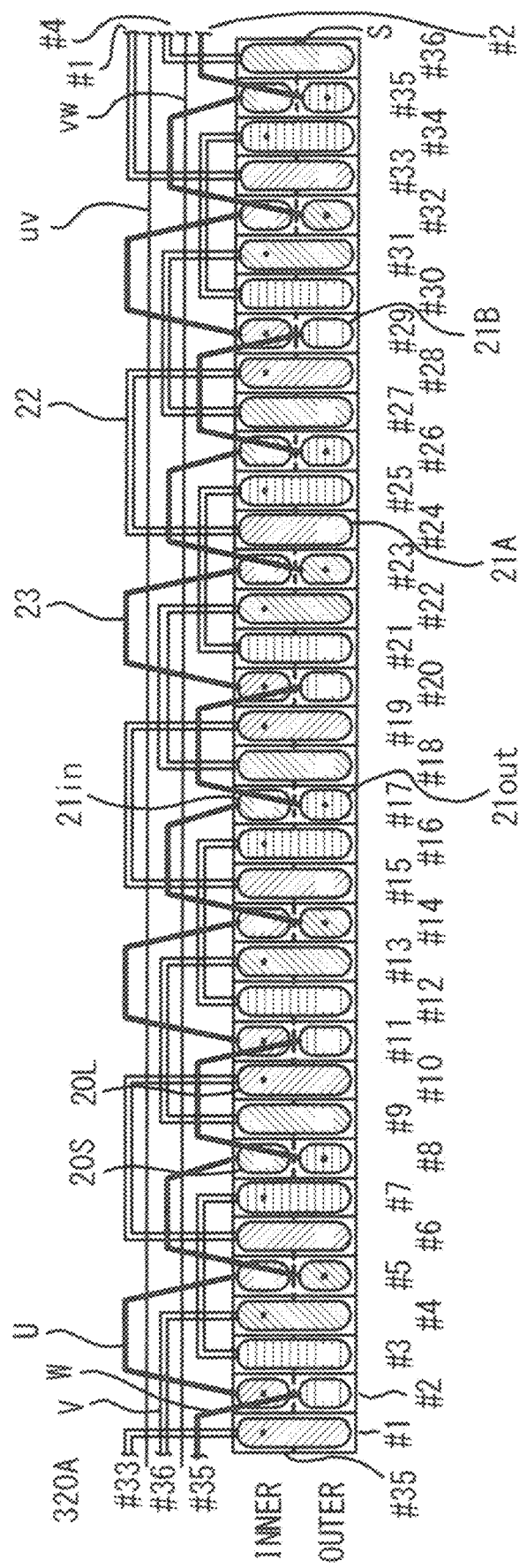
FIG. 8 is a developed sectional view of a winding by fractional slot winding according to embodiment 3.

FIG. 8 is a developed sectional view of a winding 320A by fractional slot winding.

The winding 320A is formed with 3 phases, 8 poles, and 36 slots by fractional slot winding in which the number q of slots per pole per phase is 1+½, as in the windings 20, 20A, 220A described above, and combination of the slot-inside stored portions 21 stored in the slots S is the same as that in FIG. 7.

Meanwhile, inner-side/outer-side arrangement of the slot-inside stored portions in the slots S is changed: for example, first, all the W-phase coils (eight coils shown by transverse-line hatching, such as coils inserted into the slot S at #3 and the slot S at #7 in FIG. 8) are inserted into the slots S. At this time, the small-divisional coils 20S of the W-phase coils are all inserted on the radially outer side (lower side in FIG. 8; the same applies hereafter). Next, inter-phase insulation VW between V phase and W phase is made at the coil ends. Unlike the example in FIG. 7, lap winding and concentric winding are not combined and therefore inter-phase insulation can be made collectively at the coil ends, whereby the insulation strength and productivity are improved. Next, all the V-phase coils (eight coils shown by hatching with oblique lines from upper right to lower left, such as coils inserted into the slot S at #36 and the slot S at #4 in FIG. 8) are inserted into the slots S. At this time, the small-divisional coil 20S for V-phase to be inserted into the slot S (e.g., #8) in which the small-divisional coil 20S for W phase is already inserted is placed on the radially inner side (upper side in FIG. 8; the same applies hereafter) of the small-divisional coil 20S for W phase, whereas in the slot S (e.g., #5) in which the small-divisional coil 20S for W phase has not been inserted, the small-divisional coil 20S for V phase is placed on the radially outer side. Then, as in the inter-phase insulation VW between V phase and W phase, inter-phase insulation UV between U phase and V phase is made. Next, all the U-phase coils (eight coils shown by hatching with oblique lines from upper left to lower right, such as coils inserted into the slot S at #6 and the slot S at #10 in FIG. 8) are inserted into the slots S. The small-divisional coils 20S for U phase are all placed on the radially inner side of the slots S. That is, pairs of slot-inside stored portions of the small-divisional coils 20S for W phase which is a first phase are placed on the radially outer side in the slots S (e.g., #8 and #11), pairs of slot-inside stored portions of the small-divisional coils 20S for U phase which is a second phase are all placed on the radially inner side in the slots S (e.g., #2 and #5), and one of a pair of slot-inside stored portions of each small-divisional coil 20S for V phase which is a third phase is all placed on the radially outer side in the slot S (e.g., #5), and the other one is placed on the radially inner side in the slot S (e.g., #8). Thus, the coil ends of coils for U phase, V phase, and W phase can be arranged in the radial direction in the order of U phase, V phase, and W phase from the inner side toward the outer side. Therefore, the coil end portions of the divisional coils for each phase are formed so as to be arranged at the same height (the protruding lengths in the axial direction from the core are the same) along the circumferential direction. Thus, the divisional coils forming the winding 320A can be inserted into the slot S in the order from the lower-height layer on a phase-by-phase basis, and without using lap winding, the winding 320A is formed by complete concentric winding having both single-layer concentric winding and two-layer concentric winding. As a result, it becomes possible to automatically wind the winding 320A by an inserter, thus enabling significant improvement in winding work productivity.

At this time, the coil end portions for each phase are at the same height in the axial direction and arranged in line along the circumferential direction. Therefore, the inter-phase insulations VW, UV for the coil end portions can be easily provided, whereby productivity of the winding 320A is improved.

With the rotating electric machine according to embodiment 3, the pitch of the divisional coils is reduced, whereby the axial-direction lengths of the coil end portions can be shortened. Thus, the axial-direction length of the rotating electric machine is shortened and size reduction and weight reduction of the rotating electric machine are achieved.

In this configuration, there are twelve large-divisional coils 20L for 4 pitch and there are twelve small-divisional coils 20S for 3 pitch which is smaller than the pitch for the large-divisional coils 20L. Therefore, the circumferential-direction length of the coil end portions corresponds to 132 pitch, and thus can be shortened by 26.7% as compared to the winding 20 by two-layer lap winding in FIG. 4 and by 15.4% as compared to the winding 20A by concentric lap winding in FIG. 6. Thus, efficiency of the rotating electric machine can be improved owing to reduction in primary copper loss, property of the rotating electric machine can be improved owing to reduction in leakage reactance at the coil end portions, and the weight of the rotating electric machine can be reduced owing to reduction in copper amount.

Embodiment 4

Hereinafter, with reference to the drawings, a rotating electric machine according to embodiment 4 will be described focusing on difference from embodiment 1.

Figure 9:
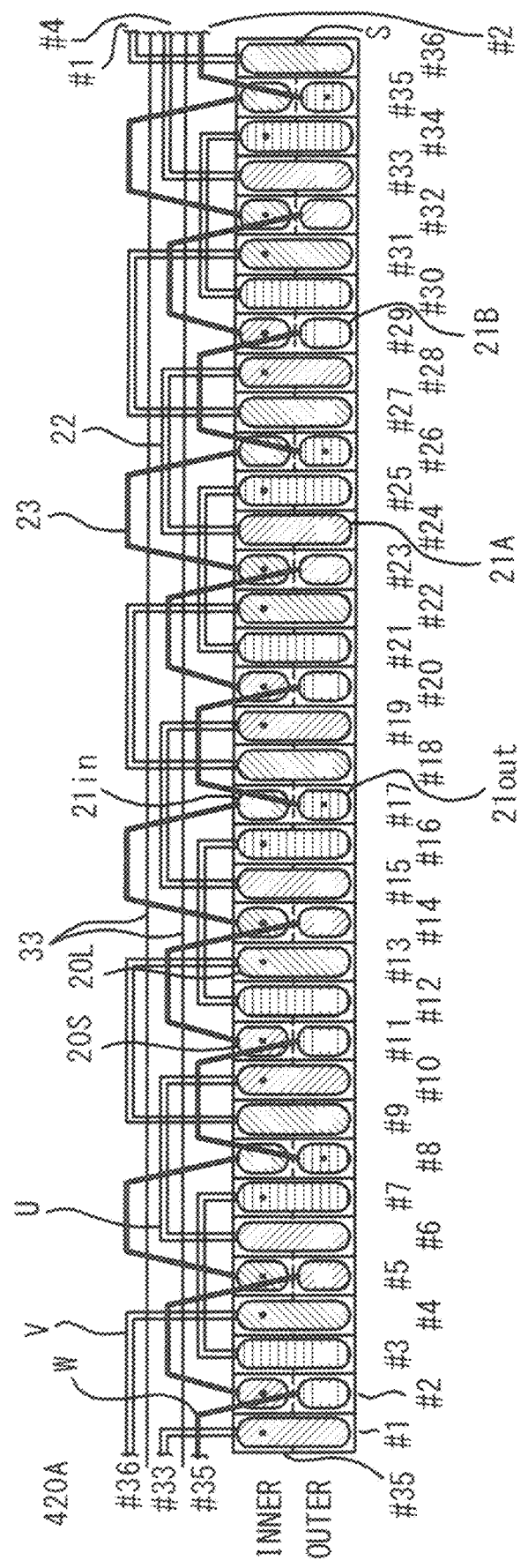
FIG. 9 is a developed sectional view of a winding by fractional slot winding according to embodiment 4.

FIG. 9 is a developed sectional view of a winding 420A by fractional slot winding according to embodiment 4.

The winding 420A is formed with 3 phases, 8 poles, and 36 slots by fractional slot winding in which the number q of slots per pole per phase is 1+½, as in the windings 20, 20A, 220A, 320A, while the insertion order of the slot-inside stored portions 21 for U phase and V phase in FIG. 8 is reversed. Although the inner slot-inside stored portions 21in and the outer slot-inside stored portions 21out in the slots #5, #14, #23, #32 are reversed, a generated rotating magnetic field is completely the same as in the case of the winding 320A in FIG. 8, and therefore completely the same effects as in the rotating electric machine in FIG. 8 are provided.

Embodiment 5

Hereinafter, with reference to the drawings, a rotating electric machine according to embodiment 5 will be described focusing on difference from embodiment 1.

Figure 10:
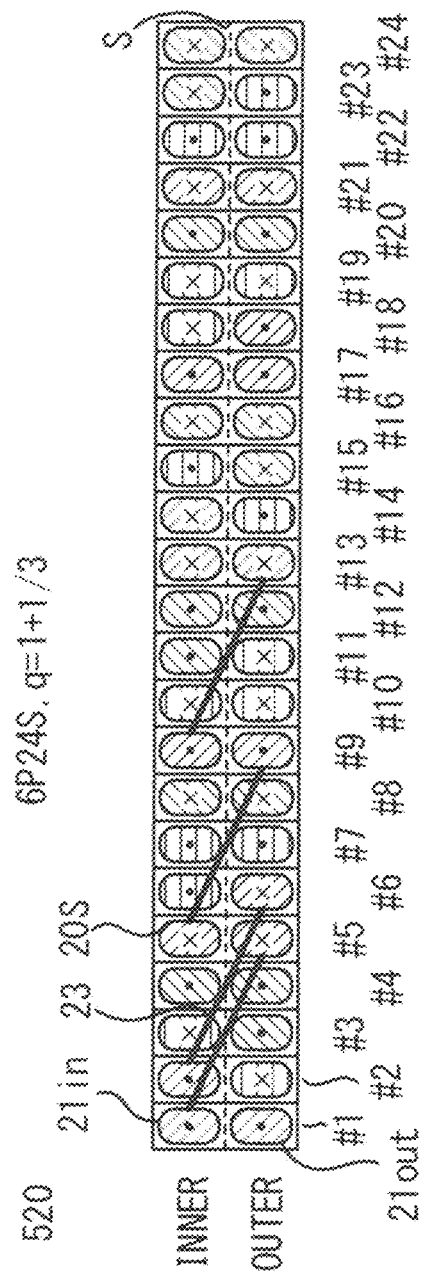
FIG. 10 is a developed sectional view of a winding by fractional slot winding in a comparative example.

FIG. 10 is a developed sectional view of a winding 520 by fractional slot winding in a comparative example.

The winding 520 in FIG. 10 is shown as a developed sectional view when the winding of the cylindrical stator of the rotating electric machine adopting fractional slot winding in which the number q of slots per pole per phase is 1+⅓ is cut open and arranged in a straight shape.

This configuration is a configuration having a minimum number of poles, i.e., there are 3 phases, 6 poles, and 24 slots, each phase is formed by eight coils, and three poles are formed by four coils. There are twenty-four small-divisional coils 20S for two-layer lap winding with 4 pitch. Therefore, the circumferential-direction length of the coil end portions corresponds to 4×24=96 pitch.

Figure 11:
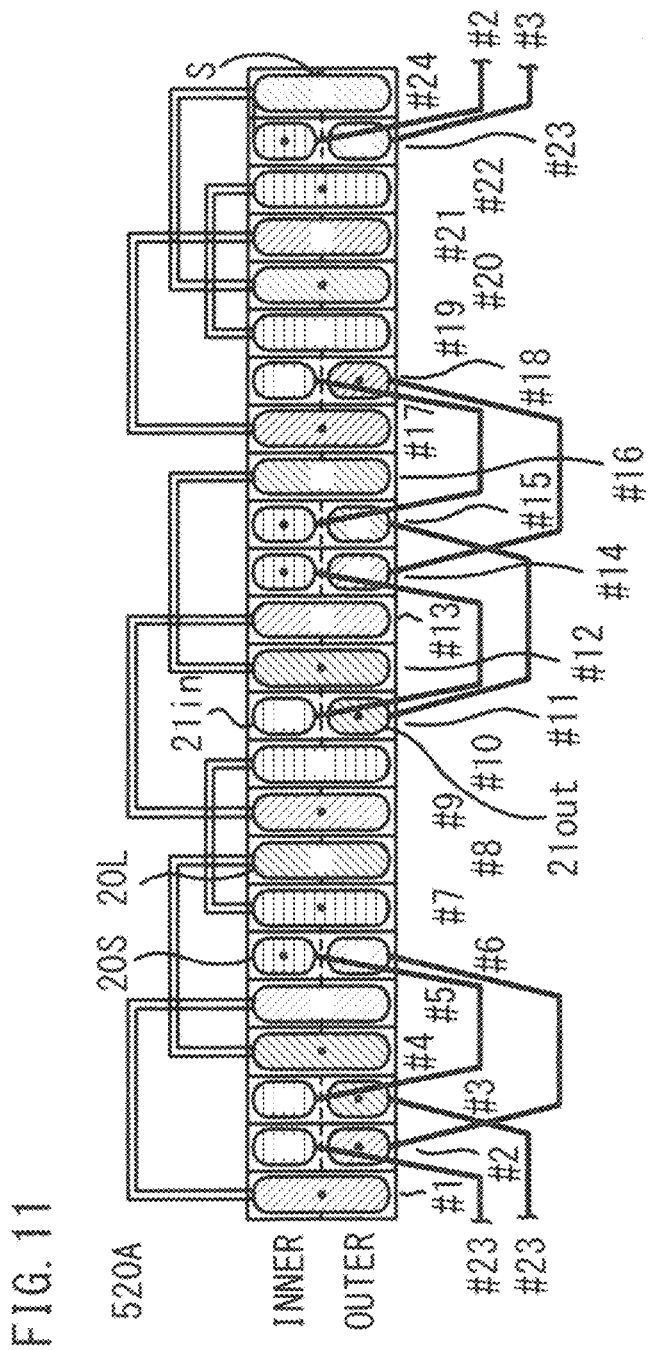
FIG. 11 is a developed sectional view of a winding by fractional slot winding according to embodiment 5.

FIG. 11 is a developed sectional view of a winding 520A by fractional slot winding according to embodiment 5.

As in FIG. 10, FIG. 11 shows a developed sectional view when the winding 520A of the cylindrical stator is cut open and arranged in a straight shape. A coil end portion shown by a double line on the upper side in the drawing represents a coil end portion of a single-layer concentric winding divisional coil (the number of turns=2n), and a coil end portion shown by a single line on the lower side represents a coil end portion of a two-layer concentric winding divisional coil (the number of turns=n) (the same applies in the subsequent drawings).

In this configuration, there are six large-divisional coils 20L for single-layer concentric winding with 4 pitch, there are two large-divisional coils 20L for single-layer concentric winding with 3 pitch which is smaller than the pitch for the above large-divisional coils 20L, there are four small-divisional coils 20S for two-layer winding with 3 pitch, and there are four small-divisional coils 20S for two-layer winding with 4 pitch. Thus, there are a total of sixteen divisional coils. The circumferential-direction length of the coil end portions corresponds to 4×6×2+3×2×2+4×4+3×4=88 pitch.

As compared to the winding 520, the number of divisional coils can be decreased from 24 to 16, i.e., by 33.3%, and the circumferential-direction length of the coil end portions can be shortened from 96 to 88, i.e., by 8.3%. Thus, productivity can be improved owing to decrease in the number of divisional coils, the weight can be reduced owing to reduction in copper amount, and efficiency can be improved owing to reduction in copper loss. It is noted that the same effects as in the present embodiment are provided even in a case where the number of poles and the number of slots are multiplied by an integer, e.g., 12 poles and 48 slots or 18 poles and 72 slots.

Embodiment 6

Hereinafter, with reference to the drawings, a rotating electric machine according to embodiment 6 will be described focusing on difference from embodiment 1.

Figure 12:
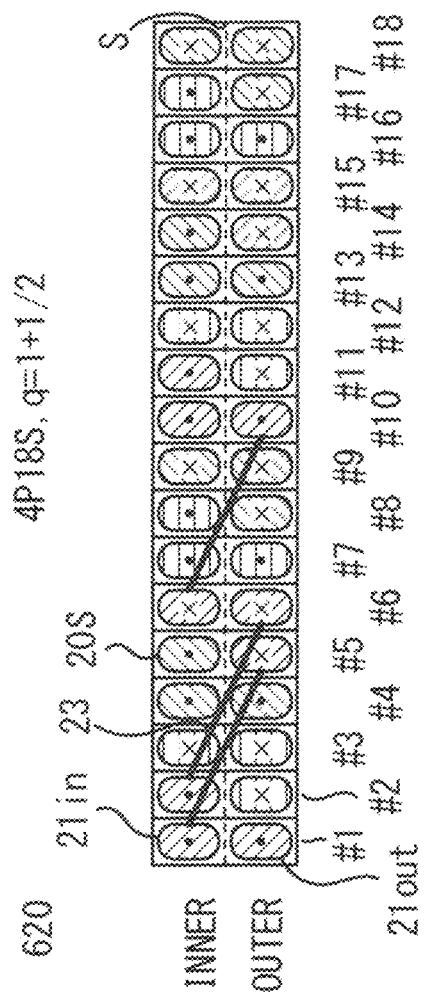
FIG. 12 is a developed sectional view of a winding by fractional slot winding in a comparative example.

FIG. 12 is a developed sectional view of a winding 620 by fractional slot winding in a comparative example.

The winding 620 in FIG. 12 is shown as a developed sectional view when the winding of the cylindrical stator of the rotating electric machine adopting fractional slot winding in which the number q of slots per pole per phase is 1+½ is cut open and arranged in a straight shape.

This configuration is a configuration having a minimum number of poles, i.e., there are 3 phases, 4 poles, and 18 slots, each phase is formed by six coils, and two poles are formed by three coils. There are eighteen small-divisional coils 20S for two-layer lap winding with 4 pitch. Therefore, the circumferential-direction length of the coil end portions corresponds to 4×18=72 pitch.

Figure 13:
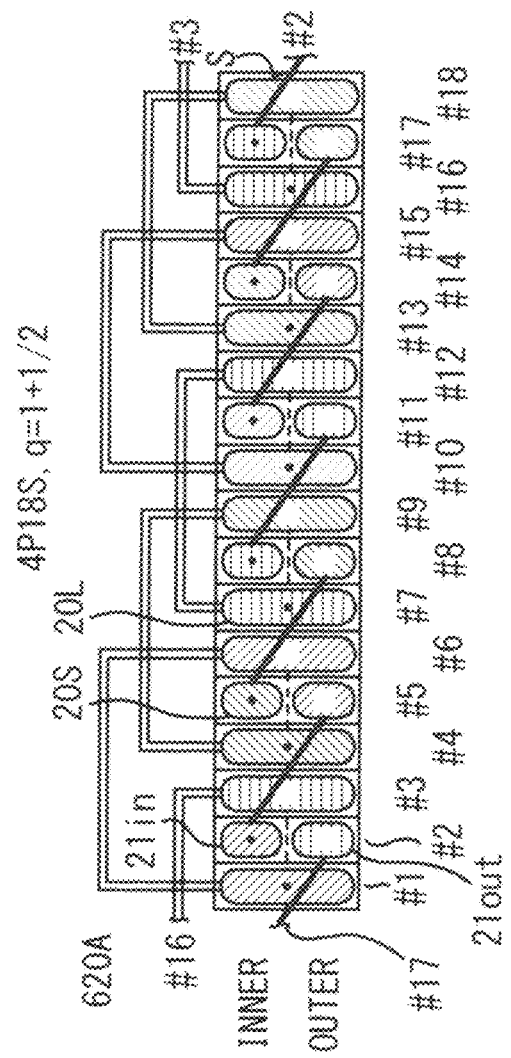
FIG. 13 is a developed sectional view of a winding by fractional slot winding according to embodiment 6.

FIG. 13 is a developed sectional view of a winding 620A by fractional slot winding according to embodiment 6.

As in FIG. 12, FIG. 13 shows a developed sectional view when the winding 620A of the cylindrical stator is cut open and arranged in a straight shape.

In this configuration, there are six large-divisional coils 20L for single-layer concentric winding with 5 pitch, and there are six small-divisional coils 20S for two-layer lap winding with 3 pitch which is smaller than the pitch for the large-divisional coils 20L. Thus, there are a total of twelve divisional coils. The circumferential-direction length of the coil end portions corresponds to 5×6×2+3×6=78 pitch.

As compared to the winding 620, the number of divisional coils can be decreased from 18 to 12, e.g., by 33.3%. Thus, productivity can be improved owing to decrease in the number of divisional coils, the weight can be reduced owing to reduction in copper amount, and efficiency can be improved owing to reduction in copper loss. It is noted that the same effects as in the present embodiment are provided even in a case where the number of poles and the number of slots are multiplied by an integer, e.g., 8 poles and 36 slots or 12 poles and 54 slots.

Embodiment 7

Hereinafter, with reference to the drawings, a rotating electric machine according to embodiment 7 will be described focusing on difference from embodiment 1.

Figure 14:
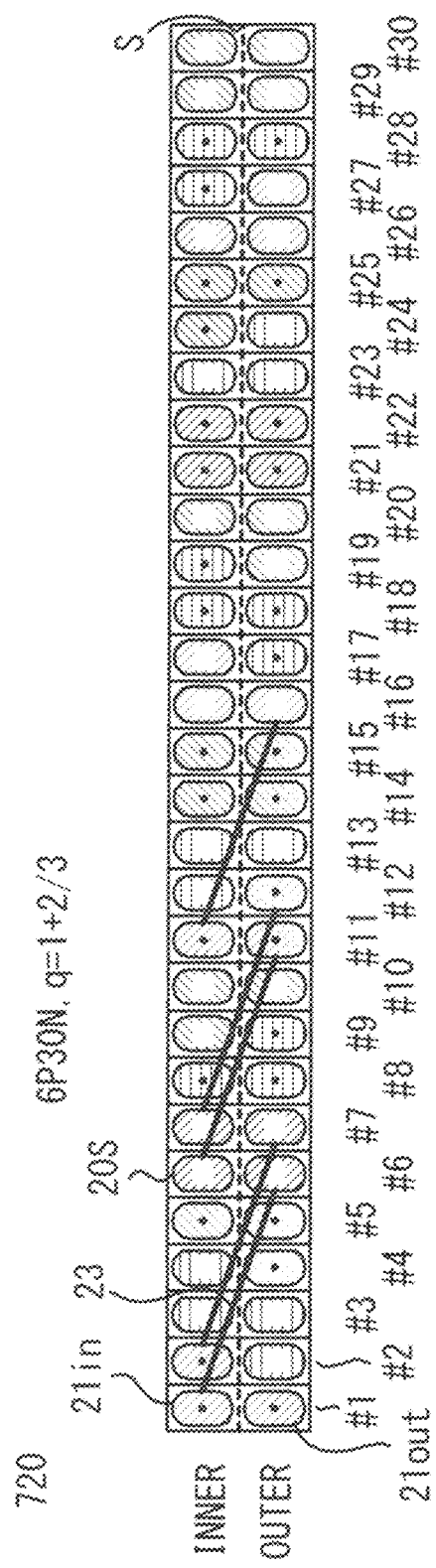
FIG. 14 is a developed sectional view of a winding by fractional slot winding in a comparative example.

FIG. 14 is a developed sectional view of a winding 720 by fractional slot winding in a comparative example.

The winding 720 in FIG. 14 is shown as a developed sectional view when the winding of the cylindrical stator of the rotating electric machine adopting fractional slot winding in which the number q of slots per pole per phase is 1+⅔ is cut open and arranged in a straight shape.

This configuration is a configuration having a minimum number of poles, i.e., there are 3 phases, 6 poles, and 30 slots, each phase is formed by ten coils, and three poles are formed by five coils. There are thirty small-divisional coils 20S for two-layer lap winding with 5 pitch. Therefore, the circumferential-direction length of the coil end portions corresponds to 5×30=150 pitch.

Figure 15:
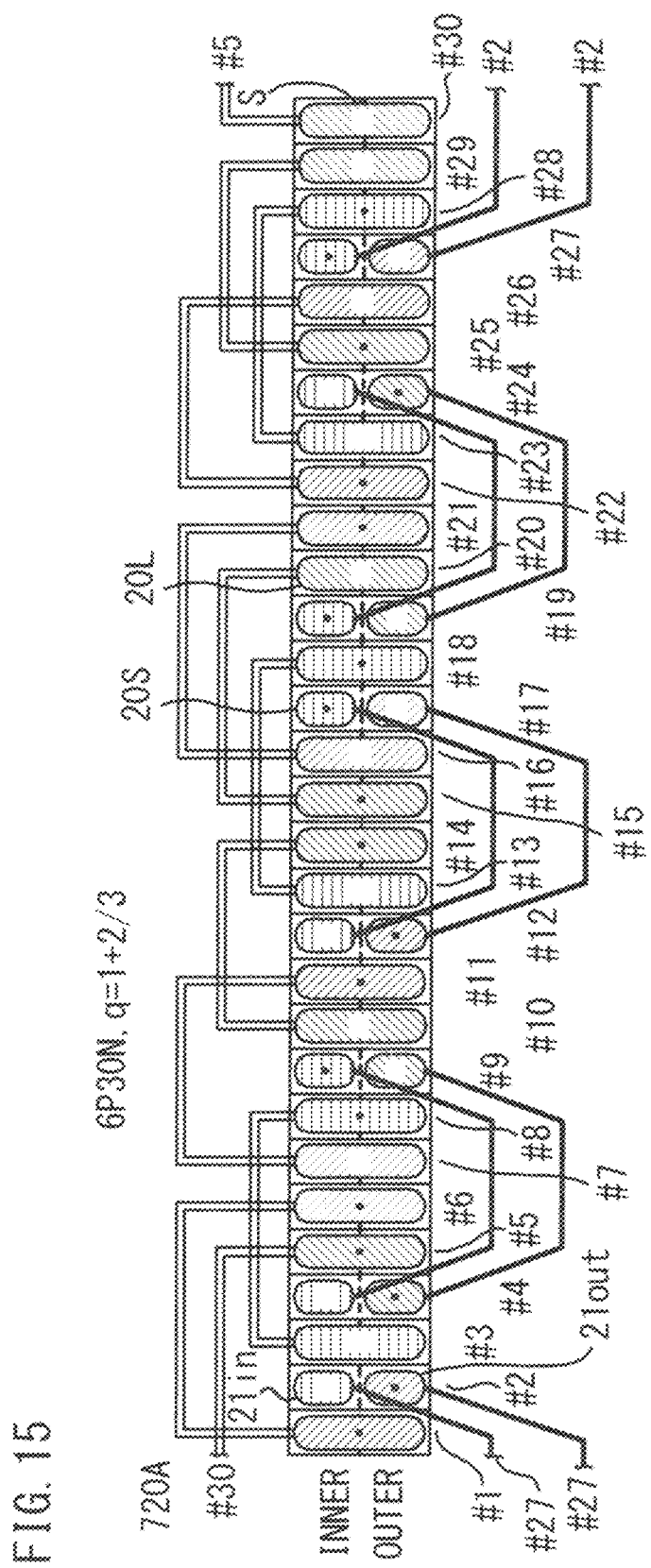
FIG. 15 is a developed sectional view of a winding by fractional slot winding according to embodiment 7.

FIG. 15 is a developed sectional view of a winding 720A by fractional slot winding according to embodiment 7.

As in FIG. 14, FIG. 15 shows a developed sectional view when the winding 720A of the cylindrical stator is cut open and arranged in a straight shape.

In this configuration, there are seven large-divisional coils 20L for single-layer concentric winding with 5 pitch, there are four large-divisional coils 20L for single-layer concentric winding with 4 pitch, and there are eight small-divisional coils 20S for two-layer lap winding with 5 pitch. Thus, there are a total of nineteen divisional coils. The circumferential-direction length of the coil end portions corresponds to 5×7×2+4×4×2+5×8=142 pitch.

As compared to the winding 720, the number of divisional coils can be decreased from 30 to 19, i.e., by 36.7%, and the circumferential-direction length of the coil end portions can be shortened from 150 to 142, i.e., by 5.3%. Thus, productivity can be improved owing to decrease in the number of divisional coils, the weight can be reduced owing to reduction in copper amount, and efficiency can be improved owing to reduction in copper loss. It is noted that the same effects as in the present embodiment are provided even in a case where the number of poles and the number of slots are multiplied by an integer, e.g., 12 poles and 60 slots or 18 poles and 90 slots.

Embodiment 8

Hereinafter, with reference to the drawings, a rotating electric machine according to embodiment 8 will be described focusing on difference from embodiment 1.

Figure 16:
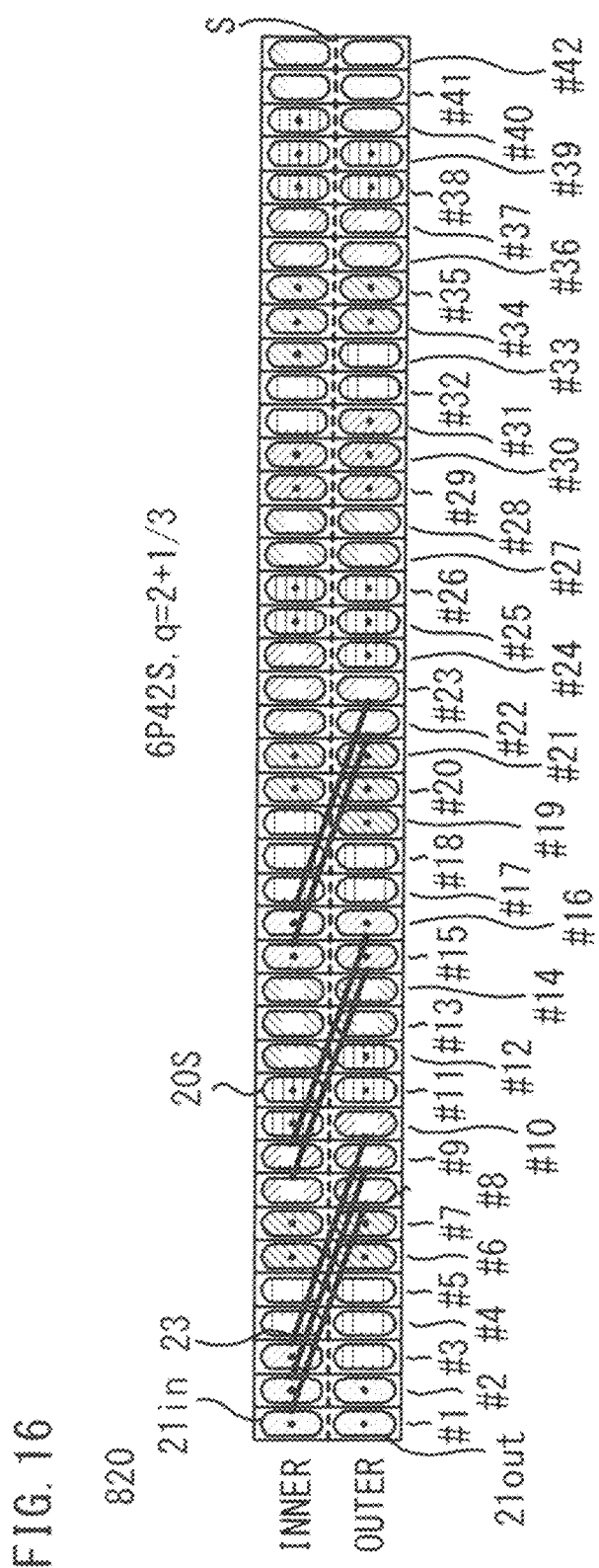
FIG. 16 is a developed sectional view of a winding by fractional slot winding in a comparative example.

FIG. 16 is a developed sectional view of a winding 820 by fractional slot winding in a comparative example.

The winding 720 in FIG. 16 is shown as a developed sectional view when the winding of the cylindrical stator of the rotating electric machine adopting fractional slot winding in which the number q of slots per pole per phase is 2+⅓ is cut open and arranged in a straight shape.

This configuration is a configuration having a minimum number of poles, i.e., there are 3 phases, 6 poles, and 42 slots, each phase is formed by fourteen coils, and three poles are formed by seven coils. There are forty-two small-divisional coils 20S for two-layer lap winding with 7 pitch. Therefore, the circumferential-direction length of the coil end portions corresponds to 7×42=294 pitch.

Figure 17:
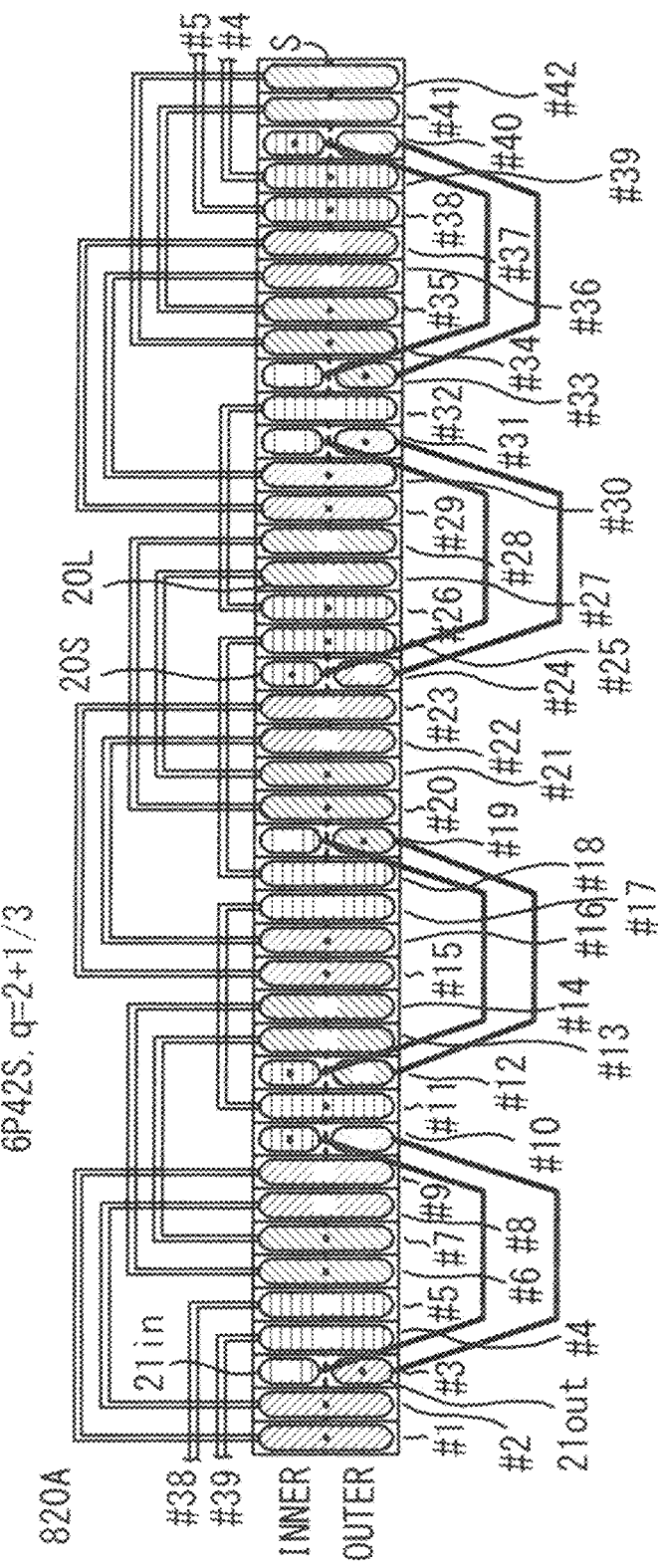
FIG. 17 is a developed sectional view of a winding by fractional slot winding according to embodiment 8.

FIG. 17 is a developed sectional view of a winding 820A by fractional slot winding according to embodiment 8.

As in FIG. 16, FIG. 17 shows a developed sectional view when the winding 820A of the cylindrical stator is cut open and arranged in a straight shape.

In this configuration, there is one large-divisional coil 20L for single-layer concentric winding with 9 pitch, there are six large-divisional coils 20L for single-layer concentric winding with 8 pitch, there are two large-divisional coils 20L for single-layer concentric winding with 7 pitch, there are eight large-divisional coils 20L for single-layer concentric winding with 6 pitch, and there are eight small-divisional coils 20S for two-layer concentric winding with 7 pitch. Thus, there are a total of twenty-five divisional coils. The circumferential-direction length of the coil end portions corresponds to 9×1×2+8×6×2+7×2×2+6×8+7×8=246 pitch.

As compared to the winding 820, the number of divisional coils can be decreased from 30 to 25, i.e., by 16.7%, and the circumferential-direction length of the coil end portions can be shortened from 294 to 246, i.e., by 16.3%. Thus, productivity can be improved owing to decrease in the number of divisional coils, the weight can be reduced owing to reduction in copper amount, and efficiency can be improved owing to reduction in copper loss. It is noted that the same effects as in the present embodiment are provided even in a case where the number of poles and the number of slots are multiplied by an integer, e.g., 12 poles and 84 slots or 18 poles and 126 slots.

Embodiment 9

Hereinafter, with reference to the drawings, a rotating electric machine according to embodiment 9 will be described focusing on difference from embodiment 1.

Figure 18:
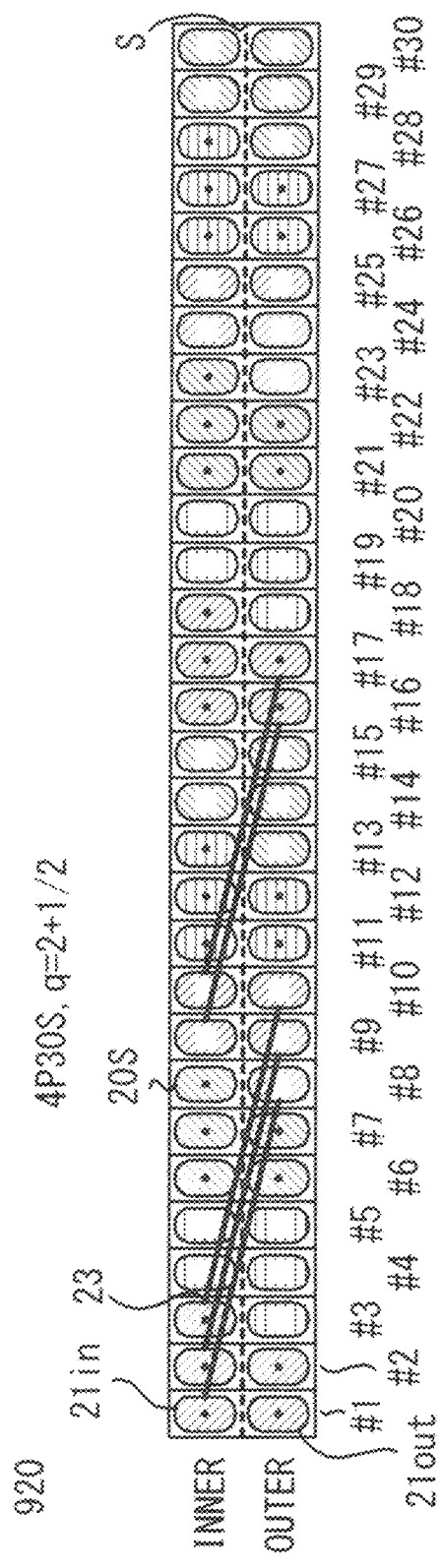
FIG. 18 is a developed sectional view of a winding by fractional slot winding in a comparative example.

FIG. 18 is a developed sectional view of a winding 920 by fractional slot winding in a comparative example.

The winding 920 in FIG. 18 is shown as a developed sectional view when the winding of the cylindrical stator of the rotating electric machine adopting fractional slot winding in which the number q of slots per pole per phase is 2+½ is cut open and arranged in a straight shape.

This configuration is a configuration having a minimum number of poles, i.e., there are 3 phases, 4 poles, and 30 slots, each phase is formed by ten coils, and two poles are formed by five coils. There are thirty small-divisional coils 20S for two-layer lap winding with 7 pitch. Therefore, the circumferential-direction length of the coil end portions corresponds to 7×30=210 pitch.

Figure 19:
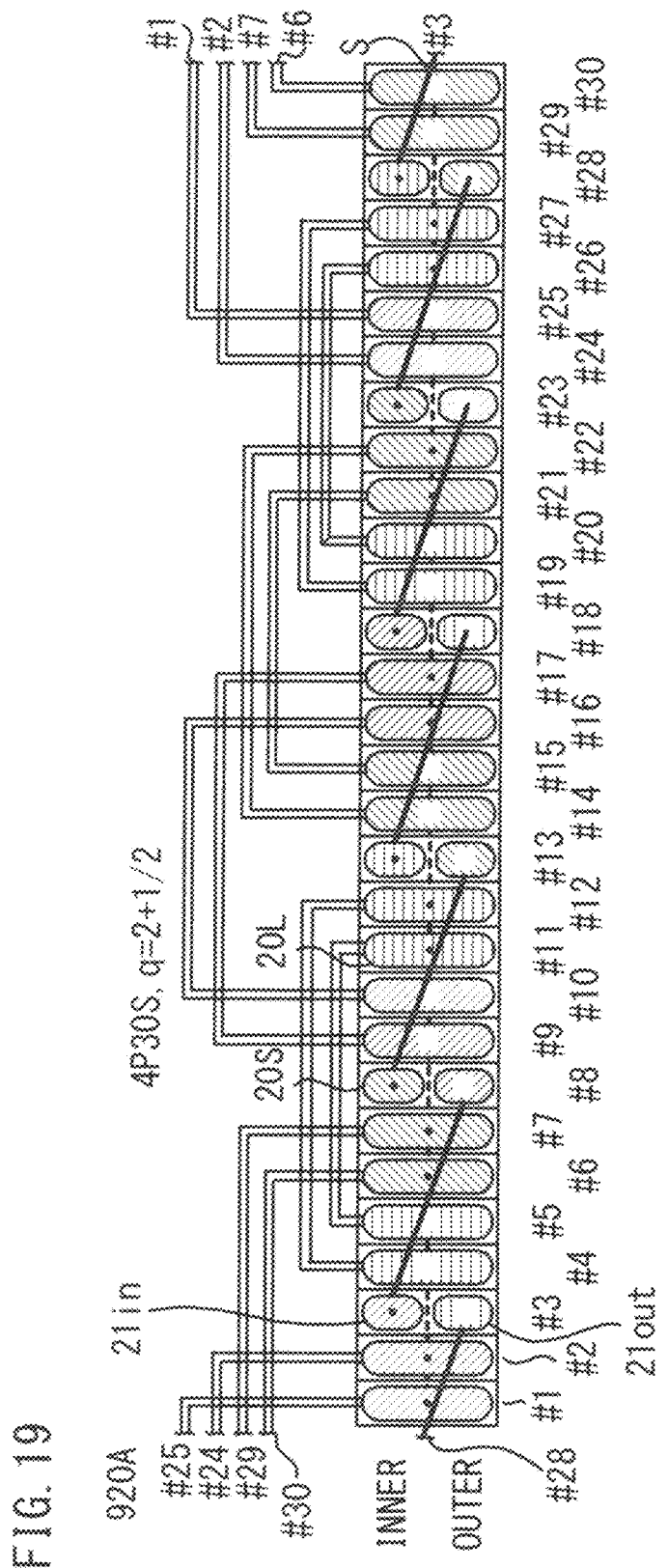
FIG. 19 is a developed sectional view of a winding by fractional slot winding according to embodiment 9.

FIG. 19 is a developed sectional view of a winding 920A by fractional slot winding according to embodiment 9.

As in FIG. 18, FIG. 19 shows a developed sectional view when the winding 920A of the cylindrical stator is cut open and arranged in a straight shape.

In this configuration, there are six large-divisional coils 20L for single-layer concentric winding with 8 pitch, there are six large-divisional coils 20L for single-layer concentric winding with 6 pitch, and there are six small-divisional coils 20S for two-layer lap winding with 5 pitch which is smaller than the pitches for the large-divisional coils 20L. Thus, there are a total of eighteen divisional coils. The circumferential-direction length of the coil end portions corresponds to 8×6×2+6×6×2+5×6=198 pitch.

As compared to the winding 920, the number of divisional coils can be decreased from 30 to 18, i.e., by 40%, and the circumferential-direction length of the coil end portions can be shortened from 210 to 198, i.e., by 5.7%. Thus, productivity can be improved owing to decrease in the number of divisional coils, the weight can be reduced owing to reduction in copper amount, and efficiency can be improved owing to reduction in copper loss. It is noted that the same effects as in the present embodiment are provided even in a case where the number of poles and the number of slots are multiplied by an integer, e.g., 8 poles and 60 slots or 12 poles and 90 slots.

Embodiment 10

Hereinafter, with reference to the drawings, a rotating electric machine according to embodiment 10 will be described focusing on difference from embodiment 1.

Figure 20:
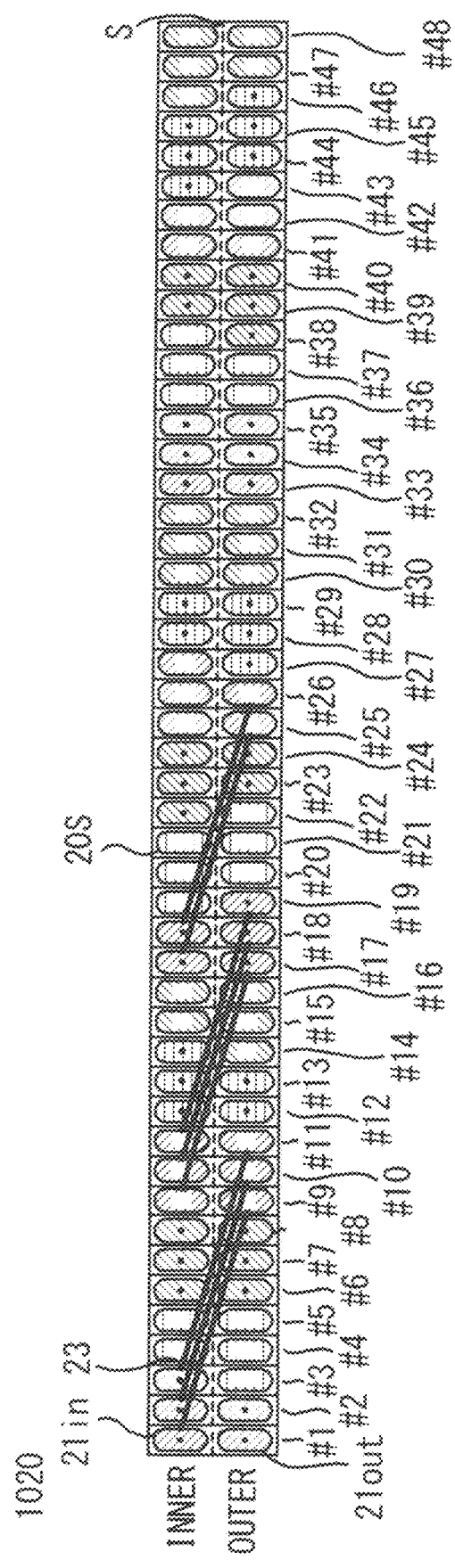
FIG. 20 is a developed sectional view of a winding by fractional slot winding in a comparative example.

FIG. 20 is a developed sectional view of a winding 1020 by fractional slot winding in a comparative example.

The winding 1020 in FIG. 20 is shown as a developed sectional view when the winding 1020 of the cylindrical stator of the rotating electric machine adopting fractional slot winding in which the number q of slots per pole per phase is 2+⅔ is cut open and arranged in a straight shape.

This configuration is a configuration having a minimum number of poles, i.e., there are 3 phases, 6 poles, and 48 slots, each phase is formed by sixteen coils, and three poles are formed by eight coils. There are forty-eight small-divisional coils 20S for two-layer lap winding with 8 pitch. Therefore, the circumferential-direction length of the coil end portions corresponds to 8×48=384 pitch.

Figure 21:
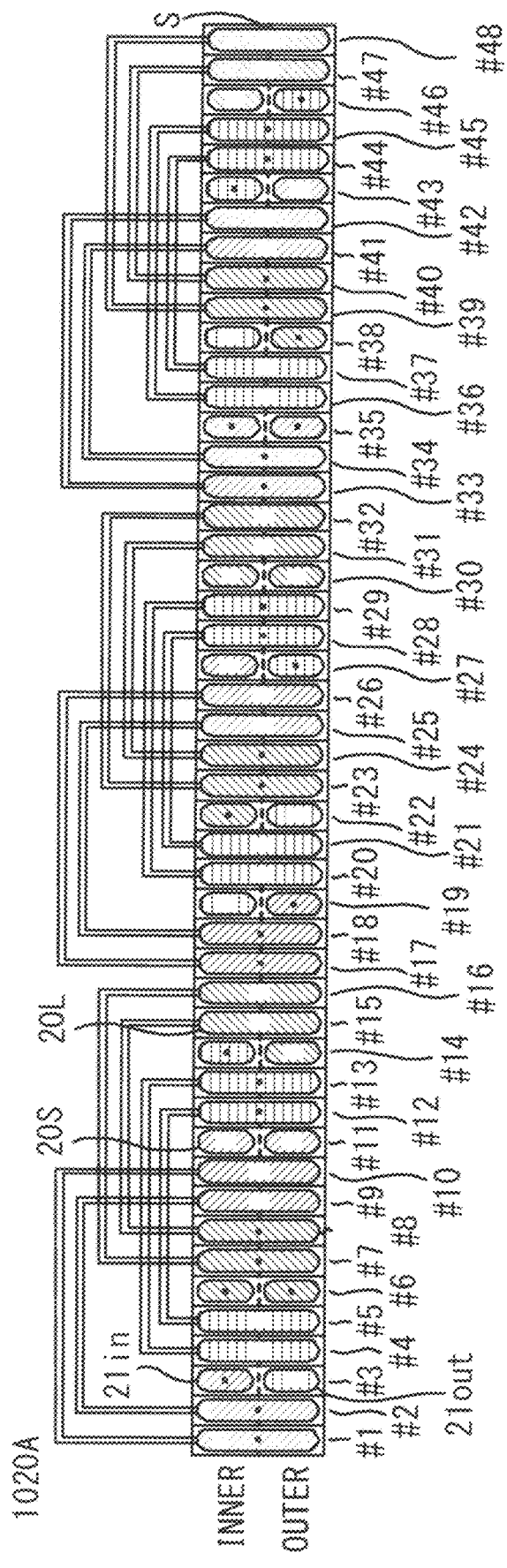
FIG. 21 is a developed sectional view of a winding by fractional slot winding according to embodiment 10.

FIG. 21 is a developed sectional view of a winding 1020A by fractional slot winding according to embodiment 10.

As in FIG. 20, FIG. 21 shows a developed sectional view when the winding 1020A of the cylindrical stator is cut open and arranged in a straight shape.

In this configuration, there are nine large-divisional coils 20L for single-layer concentric winding with 9 pitch, there are nine large-divisional coils 20L for single-layer concentric winding with 7 pitch, and there are twelve small-divisional coils 20S for two-layer lap winding with 8 pitch which is smaller than the pitch of the 9-pitch large-divisional coils 20L. Thus, there are a total of twenty-four divisional coils. The circumferential-direction length of the coil end portions corresponds to 9×9×2+7×9×2+8×12=384 pitch.

As compared to the winding 1020, the number of divisional coils can be decreased from 48 to 30, i.e., by 37.5%. Thus, productivity can be improved owing to decrease in the number of divisional coils, the weight can be reduced owing to reduction in copper amount, and efficiency can be improved owing to reduction in copper loss.

It is noted that the same effects as in the present embodiment are provided even in a case where the number of poles and the number of slots are multiplied by an integer, e.g., 12 poles and 96 slots and 18 poles and 144 slots.

Embodiment 11

Hereinafter, with reference to the drawings, a rotating electric machine according to embodiment 11 will be described focusing on difference from embodiments 1 to 10.

Figure 22:
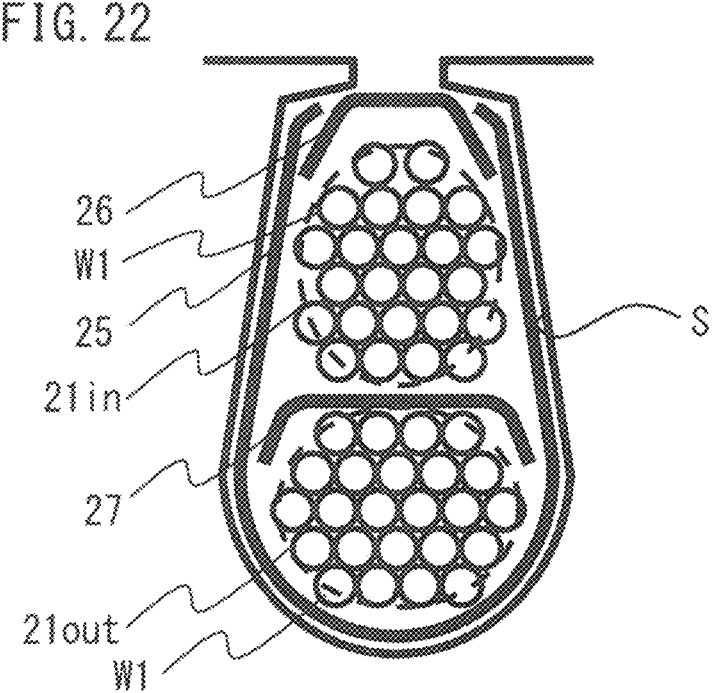
FIG. 22 is a sectional view of a stator slot in which two-layer coils are inserted, in a rotating electric machine according to embodiment 11.

FIG. 22 is a sectional view of the slot S of the stator in which two-layer divisional coils (small-divisional coils) are inserted, in the rotating electric machine according to the present embodiment 11.

Figure 23:
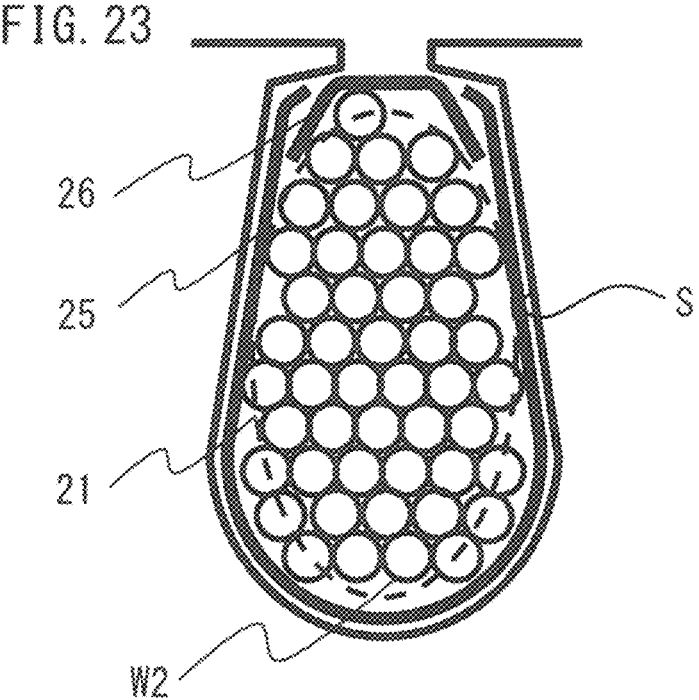
FIG. 23 is a sectional view of a stator slot in which a single-layer coil is inserted, in the rotating electric machine according to embodiment 11.

FIG. 23 is a sectional view of the slot S of the stator in which a single-layer divisional coil (large-divisional coil) is inserted, in the rotating electric machine according to the present embodiment 11.

Regarding the small-divisional coil 20S shown in FIG. 22, for example, in a case of performing winding with 24 turns, in embodiments 1 to 10, the large-divisional coil 20L is wound with 48 turns and thus the turns ratio is 1:2. For the slot-inside stored portion 21 of the large-divisional coil 20L, the separator 27 is not needed and therefore the space factor (the ratio of the winding area to the slot area where a wire can be wound excluding a sectional area of an insulating material and the like) is low.

Accordingly, as shown in FIG. 23, for the large-divisional coil 20L, by utilizing a margin part where the separator 27 is absent, a wire W2 having a larger diameter than a wire W1 of the small-divisional coil 20S is used as a wire of the large-divisional coil 20L. Thus, the resistance value of the large-divisional coil 20L is reduced, whereby copper loss can be reduced and efficiency of the rotating electric machine can be improved.

Embodiment 12

Hereinafter, with reference to the drawings, a rotating electric machine according to embodiment 12 will be described focusing on difference from embodiments 1 to 10.

Figure 24:
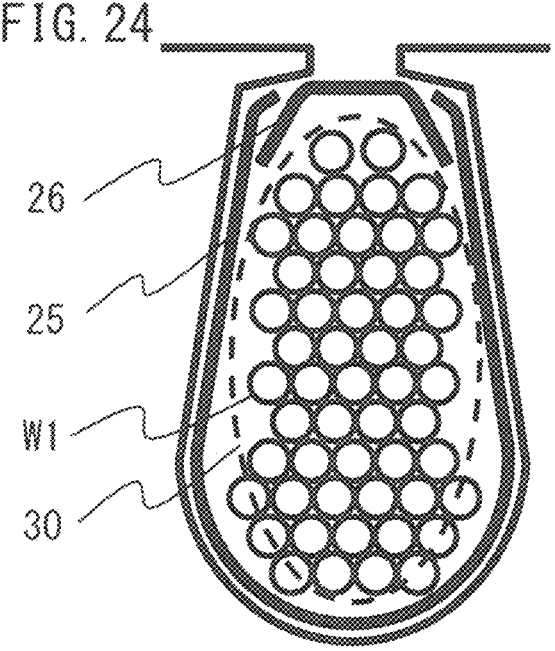
FIG. 24 is a sectional view of a stator slot in which a single-layer coil is inserted, in a rotating electric machine according to embodiment 12.

FIG. 24 is a sectional view of the slot S of the stator in which a single-layer divisional coil is inserted, in the rotating electric machine according to the present embodiment 12.

In the present embodiment, a wire is additionally wound in a vacant space where the separator 27 is not needed in embodiments 1 to 10, and for example, in a case where each of the small-divisional coils 20S (two-layer coils) is wound with 24 turns, the large-divisional coil 20L (single-layer coil) is provided with additional 5 turns so as to be wound with 53 turns. Thus, efficiency of the rotating electric machine can be improved.

Embodiment 13

Hereinafter, with reference to the drawings, a rotating electric machine according to embodiment 13 will be described focusing on difference from embodiments 1 to 10.

Figure 25:
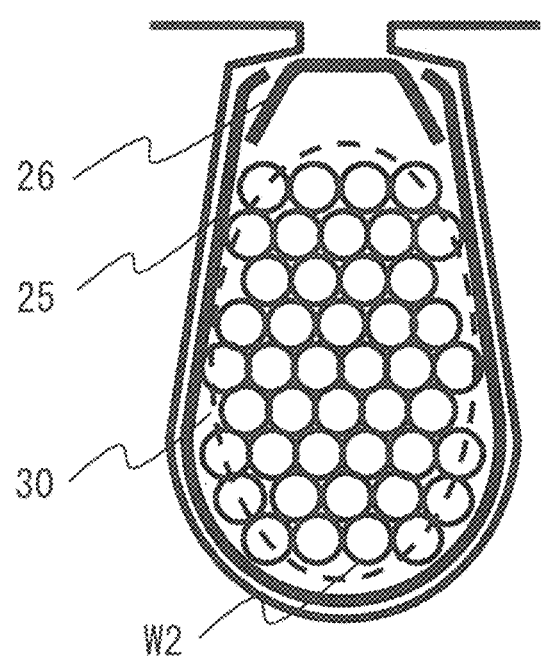
FIG. 25 is a sectional view of a stator slot in which a single-layer coil is inserted, in a rotating electric machine according to embodiment 13.

FIG. 25 is a sectional view of the slot S of the stator in which a single-layer coil is inserted, in the rotating electric machine according to the present embodiment 13.

In the present embodiment, by utilizing a vacant space where the separator 27 is not needed in embodiments 1 to 10, a wire having a larger diameter than a wire of the small-divisional coil 20S is used as a wire of the large-divisional coil 20L. Further, the number of turns of the large-divisional coil 20L is decreased by 2 turns as compared to embodiments 1 to 10, whereby the resistance value of the large-divisional coil 20L is reduced, thus achieving reduction in copper loss and improvement in efficiency. In this way, in relation to the wire diameter and the space factor, the number of turns may be increased, or considering required property, the number of turns may be decreased and the wire diameter may be enlarged.

Embodiment 14

Hereinafter, with reference to the drawings, a rotating electric machine according to embodiment 14 will be described focusing on difference from embodiments 1 to 10.

Figure 26:
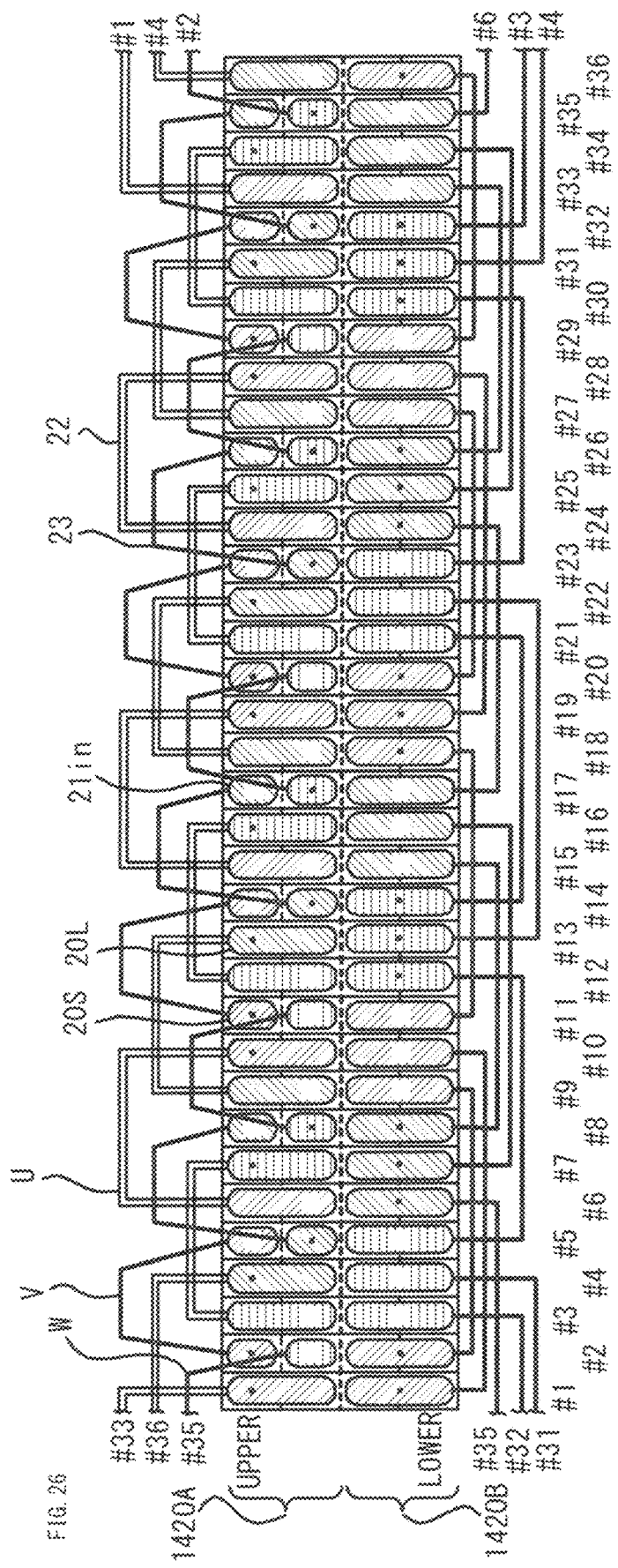
FIG. 26 is a developed sectional view of a winding by fractional slot winding according to embodiment 14.

FIG. 26 is a developed sectional view of the slots S of the stator in which pole changing (duplex winding) coils are inserted, in the rotating electric machine according to the present embodiment 14.

In the present embodiment, in the slots S of the stator, at least two independent windings 1420A, 1420B having different numbers of poles are mounted, and at least one of them is the winding of any of embodiments 1 to 10.

When current is applied to one of the at least two independent windings 1420A, 1420B, the rotating electric machine rotates, and the rotor rotates at a rotational speed inversely proportional to the number of poles of the winding to which current is applied (the rotational speed ∝ the electric angle frequency of current applied to the winding/(the number of poles of the winding/2)). It is possible to change the rotational speed of the motor by switching the winding to which current is applied.

FIG. 26 shows a case where the 8-pole winding having the configuration in embodiment 3 is mounted on the radially inner side in the slots and a 4-pole winding (2-1 concentric winding, which is a conventional winding generally used) is mounted on the radially outer side in the slots. When current is applied to the 8-pole winding, the rotating electric machine can be rotated at a rotational speed that is approximately half a rotational speed when current is applied to the 4-pole winding. Thus, by switching the winding to which current is applied, it is possible to switch the rotational speed between high-speed rotation (4-pole winding) and low-speed rotation (8-pole winding), using current having the same electric angle frequency.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 100A, 100B, 100C rotating electric machine
11A, 11B housing
12A, 12B, 12C frame
13, 13C bracket
14A, 14C stator
15 bearing
16 rotary shaft
17A, 17B, 17C rotor
20, 20A, 220A, 320A, 420A, 520, 520A, 620, 620A, 720, 720A, 820, 820A, 920, 920A, 1020, 1020A, 1420A, 1420B winding
21, 21A, 21B slot-inside stored portion
21in inner slot-inside stored portion
21out outer slot-inside stored portion
22, 23 coil end portion
25 slot cell
26 wedge
27 separator
UV, VW inter-phase insulation
Mg permanent magnet
W1, W2 wire
S slot

The invention claimed is:

1. A stator of a rotating electric machine, the stator comprising a winding, wherein
the winding has a plurality of divisional coils,
each of the divisional coils has a pair of slot-inside stored portions which are respectively stored in different slots among a plurality of slots formed between adjacent teeth of the stator,
where a number of poles of a rotor used together with the stator is P, a number of phases of an AC power supply applied to the rotating electric machine is M which is an integer not less than 3, and a number of the slots is Sn, a number q of slots per pole per phase represented as q=Sn/(P×M) is an irreducible fraction, and
the divisional coils include two types which are a large-divisional coil of which the pair of slot-inside stored portions are each stored alone in the slot and are connected via coil end portions on both end surface sides in an axial direction of the stator, thus being wound by single-layer concentric winding, and a small-divisional coil of which the pair of slot-inside stored portions are each stored in the slot together with the slot-inside stored portion of the other corresponding divisional coil.

2. The stator of the rotating electric machine according to claim 1, wherein
a coil pitch of the small-divisional coil is smaller than a coil pitch of the large-divisional coil.

3. The stator of the rotating electric machine according to claim 2, wherein
all the small-divisional coils are formed by two-layer lap winding such that one of the pair of slot-inside stored portions placed on a radially inner side in the slot and the other one placed on a radially outer side in the slot different from said slot are connected via coil end portions on both end surface sides in the axial direction of the stator.

4. The stator of the rotating electric machine according to claim 2, wherein
the winding includes the divisional coils for three phases,
the pairs of slot-inside stored portions of the small-divisional coils for a first phase are all placed on a radially outer side in the slots and are respectively connected via coil end portions on both end surface sides in the axial direction of the stator,
the pairs of slot-inside stored portions of the small-divisional coils for a second phase are all placed on a radially inner side in the slots and are respectively connected via coil end portions on both end surface sides in the axial direction of the stator,
one of the pair of slot-inside stored portions of each small-divisional coil for a third phase is placed on a radially outer side in the slot, and the other one is placed on a radially inner side in the slot, and
the pair of slot-inside stored portions of each small-divisional coil for the third phase are connected via coil end portions on both end surface sides in the axial direction of the stator.

5. The stator of the rotating electric machine according to claim 2, wherein
the large-divisional coil and the small-divisional coil are different from each other in wire diameter.

6. The stator of the rotating electric machine according to claim 2, wherein
between the small-divisional coil and the large-divisional coil, a turns ratio of wires forming the respective divisional coils is 1:2.

7. The stator of the rotating electric machine according to claim 1, wherein
all the small-divisional coils are formed by two-layer lap winding such that one of the pair of slot-inside stored portions placed on a radially inner side in the slot and the other one placed on a radially outer side in the slot different from said slot are connected via coil end portions on both end surface sides in the axial direction of the stator.

8. The stator of the rotating electric machine according to claim 7, wherein
the large-divisional coil and the small-divisional coil are different from each other in wire diameter.

9. The stator of the rotating electric machine according to claim 7, wherein
between the small-divisional coil and the large-divisional coil, a turns ratio of wires forming the respective divisional coils is 1:2.

10. The stator of the rotating electric machine according to claim 1, wherein
the winding includes the divisional coils for three phases, the pairs of slot-inside stored portions of the small-divisional coils for a first phase are all placed on a radially outer side in the slots and are respectively connected via coil end portions on both end surface sides in the axial direction of the stator, the pairs of slot-inside stored portions of the small-divisional coils for a second phase are all placed on a radially inner side in the slots and are respectively connected via coil end portions on both end surface sides in the axial direction of the stator, one of the pair of slot-inside stored portions of each small-divisional coil for a third phase is placed on a radially outer side in the slot, and the other one is placed on a radially inner side in the slot, and the pair of slot-inside stored portions of each small-divisional coil for the third phase are connected via coil end portions on both end surface sides in the axial direction of the stator.

11. The stator of the rotating electric machine according to claim 10, wherein
the coil end portions of the divisional coils for each phase are formed such that protruding lengths thereof in the axial direction from the stator are the same along a circumferential direction.

12. The stator of the rotating electric machine according to claim 11, wherein
the large-divisional coil and the small-divisional coil are different from each other in wire diameter.

13. The stator of the rotating electric machine according to claim 10, wherein
the large-divisional coil and the small-divisional coil are different from each other in wire diameter.

14. The stator of the rotating electric machine according to claim 10, wherein
between the small-divisional coil and the large-divisional coil, a turns ratio of wires forming the respective divisional coils is 1:2.

15. The stator of the rotating electric machine according to claim 1, wherein
the large-divisional coil and the small-divisional coil are different from each other in wire diameter.

16. The stator of the rotating electric machine according to claim 15, wherein
between the small-divisional coil and the large-divisional coil, a turns ratio of wires forming the respective divisional coils is not 1:2.

17. The stator of the rotating electric machine according to claim 1, wherein
between the small-divisional coil and the large-divisional coil, a turns ratio of wires forming the respective divisional coils is 1:2.

18. The stator of the rotating electric machine according to claim 1, wherein
the number q of slots per pole per phase is any of 4/3, 3/2, 5/3, 7/3, 5/2, or 8/3.

19. The stator of the rotating electric machine according to claim 1, wherein
at least two types of the windings independent of each other and having different numbers of poles are mounted in each of the slots, and
at least one type of the windings has the large-divisional coil and the small-divisional coil.

20. A rotating electric machine comprising:
the stator of the rotating electric machine according to claim 1; and
a rotor provided such that an outer circumferential surface thereof is opposed to an inner circumferential surface of the stator.

* * * * *